US012728693B2

(12) United States Patent
Enokijima et al.

(10) Patent No.: US 12,728,693 B2
(45) Date of Patent: Sep. 8, 2026

(54) VEHICLE THERMAL MANAGEMENT SYSTEM

(71) Applicant: KABUSHIKI KAISHA TOYOTA JIDOSHOKKI, Kariya (JP)

(72) Inventors: Fuminobu Enokijima, Kariya (JP); Tetsuhiko Fukanuma, Kariya (JP); Yuki Yokoi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 411 days.

(21) Appl. No.: 18/577,099

(22) PCT Filed: Mar. 11, 2022

(86) PCT No.: PCT/JP2022/010964
§ 371 (c)(1),
(2) Date: Aug. 12, 2024

(87) PCT Pub. No.: WO2023/286347
PCT Pub. Date: Jan. 19, 2023

(65) Prior Publication Data

US 2024/0399819 A1 Dec. 5, 2024

(30) Foreign Application Priority Data

Jul. 12, 2021 (JP) ................................ 2021-114768

(51) Int. Cl.
*B60H 1/00* (2006.01)
*B60H 1/22* (2006.01)
(Continued)

(52) U.S. Cl.
CPC ..... *B60H 1/00278* (2013.01); *B60H 1/00885* (2013.01); *B60H 1/00899* (2013.01);
(Continued)

(58) Field of Classification Search
CPC ........... B60H 1/00278; B60H 1/00885; B60H 1/00899; B60H 1/00921; B60H 1/32284;
(Continued)

(56) References Cited

U.S. PATENT DOCUMENTS 7,462,414 B2 * 12/2008 Sakajo .............. H01M 8/04089 429/465
7,591,143 B2 * 9/2009 Zeigler .............. B60H 1/00778 162/240
(Continued)

FOREIGN PATENT DOCUMENTS

DE 102011015151 B4 * 7/2013 ......... B60H 1/32281
DE 102020100428 A1 * 8/2020 ......... B60H 1/32284
(Continued)

OTHER PUBLICATIONS

International Search Report of PCT/JP2022/010964 dated May 17, 2022 [PCT/ISA/210].

*Primary Examiner* — Ljiljana V. Ciric
(74) *Attorney, Agent, or Firm* — Sughrue Mion, PLLC

(57) ABSTRACT

A vehicle thermal management system includes a first refrigerant circuit including a first compressor that compresses first refrigerant, a first refrigerant/inside air heat exchanger, and a first expansion valve; a cooling water circuit that circulates cooling water in the cooling water circuit; a second refrigerant circuit including a second compressor that compresses second refrigerant, a second refrigerant/outside air heat exchanger, and a second expansion valve; a first refrigerant/cooling water heat exchanger; a second refrigerant/cooling water heat exchanger; and a control unit configured to control operations of the first refrigerant circuit, the cooling water circuit, and the second refrigerant circuit. The first refrigerant circuit, the cooling water circuit, and the second refrigerant circuit operate in a
(Continued)

two-stage heat pump mode where the vehicle interior is heated, by a control of the control unit.

10 Claims, 8 Drawing Sheets

(51) Int. Cl.
*B60H 1/32* (2006.01)
*F25B 1/00* (2006.01)
*H01M 10/613* (2014.01)
*H01M 10/625* (2014.01)
*H01M 10/633* (2014.01)
*H01M 10/6568* (2014.01)
*H01M 10/663* (2014.01)

(52) U.S. Cl.
CPC ..... *B60H 1/00921* (2013.01); *B60H 1/32284* (2019.05); *F25B 1/00* (2013.01); *H01M 10/613* (2015.04); *H01M 10/625* (2015.04); *H01M 10/633* (2015.04); *H01M 10/6568* (2015.04); *H01M 10/663* (2015.04); *B60H 2001/00307* (2013.01); *B60H 2001/00928* (2013.01); *B60H 1/22* (2013.01)

(58) Field of Classification Search
CPC ............ B60H 1/22; B60H 2001/00307; B60H 2001/00928; F25B 1/00; H01M 10/613; H01M 10/625; H01M 10/633; H01M 10/6568; H01M 10/663
See application file for complete search history.

(56) References Cited

U.S. PATENT DOCUMENTS 8,733,126 B2 * 5/2014 Sekiya ...................... B60L 1/02 62/244
8,769,982 B2 * 7/2014 Ignatiev ................ F25B 31/002 428/188
10,371,420 B2 * 8/2019 Katoh ................ B60H 1/00899
10,639,957 B2 * 5/2020 Koberstein .......... B60H 1/0045
10,828,963 B2 * 11/2020 Vehr ......................... F25B 5/02
11,014,427 B2 * 5/2021 Vehr ...................... B60H 1/005
11,427,049 B2 * 8/2022 Shimauchi ........... B60H 1/3227
11,448,428 B2 * 9/2022 Kato ........................ B60H 1/22
12,173,648 B2 * 12/2024 Bollinger .................. F01K 3/12
2005/0061497 A1 * 3/2005 Amaral ............. B60H 1/00899 165/202
2008/0245503 A1 * 10/2008 Wilson ............... B60H 1/00371 165/42
2010/0080713 A1 * 4/2010 Douglas .................. F04B 49/08 417/1
2014/0311180 A1 * 10/2014 Kawakami ........ H01M 8/04059 62/498
2016/0297283 A1 * 10/2016 Sakamoto ............... F25B 47/02
2017/0203635 A1 * 7/2017 Kuroda .............. B60H 1/00342
2018/0001731 A1 * 1/2018 Vehr .................... B60H 1/3211
2018/0001739 A1 * 1/2018 Vehr ..................... F25D 29/003
2018/0001742 A1 * 1/2018 Vehr ....................... F25B 41/24
2018/0001744 A1 * 1/2018 Vehr ...................... B60H 1/005
2018/0001746 A1 * 1/2018 Vehr .................... B60H 1/3226
2018/0354342 A1 * 12/2018 Miyakoshi ........... B60H 1/3213
2019/0275866 A1 * 9/2019 Vehr .................... B60H 1/3211
2021/0016625 A1 * 1/2021 Lee .................... B60H 1/00278
2021/0101450 A1 * 4/2021 Kobayashi ............ B60L 3/0023
2024/0399819 A1 * 12/2024 Enokijima ................ F25B 1/00
2025/0033436 A1 * 1/2025 Park ................... B60H 1/00921
2025/0346093 A1 * 11/2025 Takeyama .......... B60H 1/00278

FOREIGN PATENT DOCUMENTS

DE 102020201349 A1 * 8/2021 ................ F25B 1/10
EP 3381722 A2 * 10/2018 ........... B60H 1/3222
JP 08-121889 A 5/1996
JP 2010-111269 A 5/2010
JP 2013-001268 A 1/2013
JP 2017-032220 A 2/2017
JP 6798441 B2 * 12/2020 ................ F25B 5/02
KR 10-1952115 B1 2/2019
KR 20220009163 A * 1/2022 ............. B60H 1/143

* cited by examiner

FIG. 8

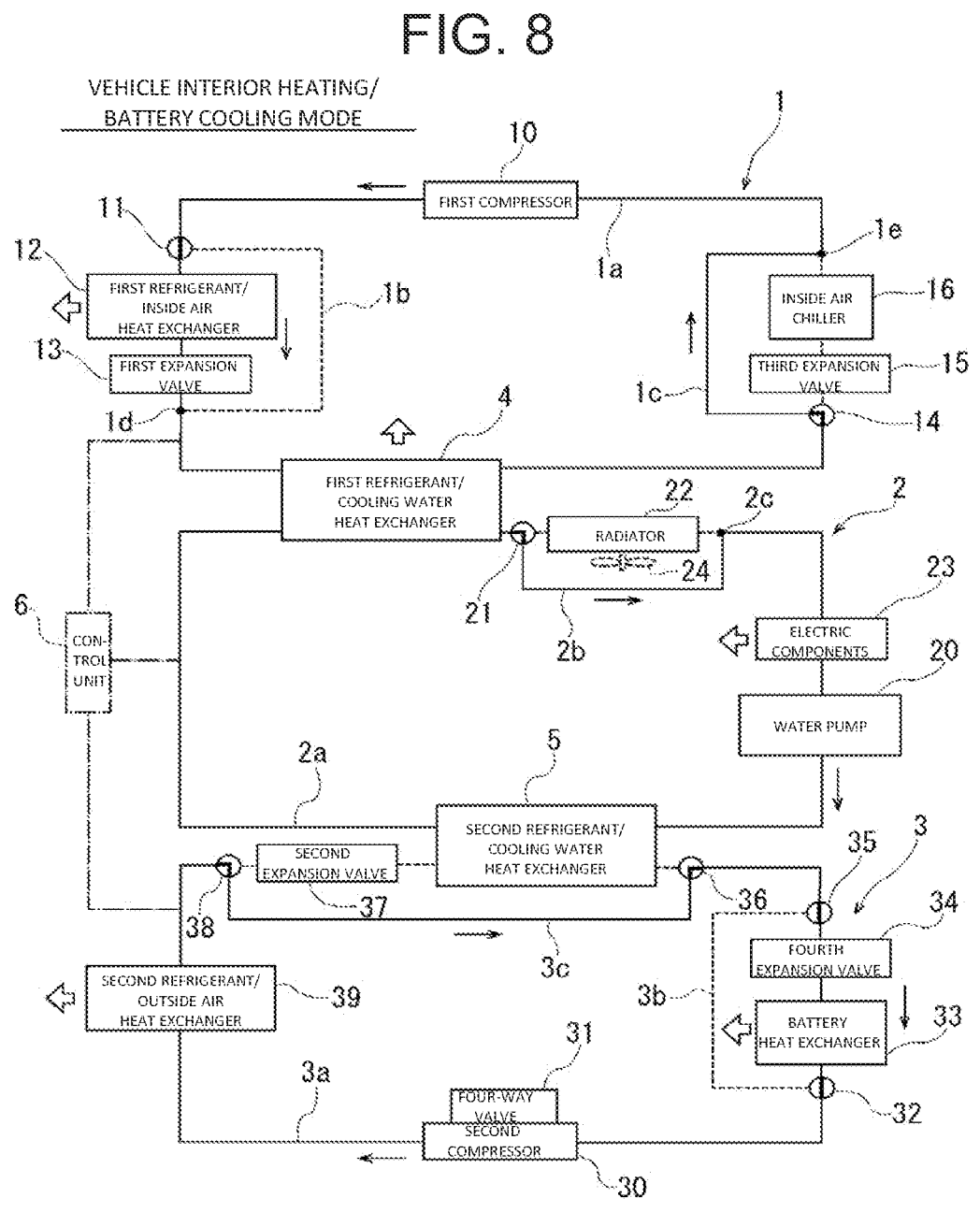

VEHICLE INTERIOR HEATING/
BATTERY COOLING MODE

FIRST COMPRESSOR
FIRST REFRIGERANT/ INSIDE AIR HEAT EXCHANGER
FIRST EXPANSION VALVE
INSIDE AIR CHILLER
THIRD EXPANSION VALVE
FIRST REFRIGERANT/ COOLING WATER HEAT EXCHANGER
RADIATOR
CON-TROL UNIT
ELECTRIC COMPONENTS
WATER PUMP
SECOND REFRIGERANT/ COOLING WATER HEAT EXCHANGER
SECOND EXPANSION VALVE
FOURTH EXPANSION VALVE
SECOND REFRIGERANT/ OUTSIDE AIR HEAT EXCHANGER
BATTERY HEAT EXCHANGER
FOUR-WAY VALVE
SECOND COMPRESSOR
1 1a 1b 1c 1d 1e 2 2a 2b 2c 3 3a 3b 3c 4 5 6 10 11 12 13 14 15 16 20 21 22 23 24 30 31 32 33 34 35 36 37 38 39

VEHICLE THERMAL MANAGEMENT SYSTEM

CROSS-REFERENCE TO RELATED APPLICATIONS

This application is a National Stage of International Application No. PCT/JP2022/010964 filed Mar. 11, 2022, claiming priority based on Japanese Patent Application No. 2021-114768 filed Jul. 12, 2021, the contents of all of which are incorporated herein by reference in their entirety.

TECHNICAL FIELD

The present invention relates to a vehicle thermal management system.

BACKGROUND ART

As a power storage device that stores a power to be supplied to the traveling motor, a lithium-ion secondary battery, a nickel-metal hydride secondary battery, or the like is mounted on vehicles that mainly run on an electric power, such as an electric vehicle (EV: Electric Vehicle) or a plug-in hybrid vehicle (PHV: Plug-in Hybrid Vehicle).

The battery generates heat during charging or discharging, and the battery is further deteriorated when the battery keeps high temperature. There is concern about damage and malfunction also in electrical components such as a traveling motor or a PCU (Power Control Unit) when a temperature of the electric components becomes excessively high while the vehicle drives at high speeds. Accordingly, a cooling system for cooling the battery and the electric components such as a cooling water circuit is generally mounted on the electric vehicle, or the like.

On the other hand, in an electric vehicle, or the like where a combustion exhaust heat from an internal combustion engine is not used to heat a vehicle interior, a PTC (Positive Temperature Coefficient) heater or a heat pump circuit is used to heat the vehicle interior.

However, in the heating using the PTC heater where an in-vehicle battery is used as an energy source, there is an issue that energy consumption efficiency is relatively low, and thus, an all-electric range is shortened. In addition, in heating using the heat pump circuit, an aerothermal energy as well as the in-vehicle battery is used as the energy source, and thus, energy consumption efficiency is higher than that in heating using the PTC heater. However, there is an issue that this heating does not sufficiently heat the vehicle interior when a temperature outside is extremely low in cold regions or the like.

Patent Document 1 discloses a conventional vehicle thermal management system suitable for an electric vehicle, or the like. This vehicle thermal management system performs air-conditioning of a vehicle interior by a heat pump circuit and cools a battery and electronic components by a cooling water circuit. The heat pump circuit and the cooling water circuit are connected by a refrigerant/cooling water heat exchanger, and the refrigerant/cooling water heat exchanger serves as an evaporator in a heating mode of the heat pump circuit.

With this configuration, in heating the vehicle interior, while the battery and the electric components are cooled by cooling water, heat is dissipated from the cooling water, which has reached a high temperature by cooling the battery and the electric components, into refrigerant in the heat pump circuit at the refrigerant/cooling water heat exchanger. Thus, exhaust heat from the battery and the electric components is effectively used as a heat source to heat the vehicle interior, so that the heating of the vehicle interior and the cooling of the battery and the electric components are efficiently performed.

CITATION LIST

Patent Document

Patent Document 1: Japanese Patent Application Publication No. 2010-111269

SUMMARY OF DISCLOSURE

Technical Problem

In recent years, a battery-mounted vehicle such as an electric vehicle has attracted a lot of attention in an automobile industry from a viewpoint of improving the global environment, and a penetration rate of the battery-mounted vehicle has increased. Accordingly, it is required to develop a new system that suitably cools the battery and the electric components and suitably performs air conditioning of the vehicle interior in the battery-mounted vehicle.

In particular, the system that effectively heats the vehicle interior even when the temperature outside is low in cold regions or the like is more suitable for the battery-mounted vehicle.

The present invention has been made in view of the above circumstances, and a technical problem to be solved according to the present invention is to provide a vehicle thermal management system that suitably cools an in-vehicle battery and suitably performs air conditioning of a vehicle interior in a battery-mounted vehicle and also effectively heats the vehicle interior even when a temperature outside is low in cold regions or the like.

Solution to Problem

A vehicle thermal management system according to the present invention includes: a first refrigerant circuit including a first compressor that compresses first refrigerant and circulates the first refrigerant in the first refrigerant circuit, a first refrigerant/inside air heat exchanger that exchanges heat between the first refrigerant and inside air supplied into a vehicle interior, and a first expansion valve, the first refrigerant circuit being configured to perform air conditioning of the vehicle interior; a cooling water circuit including a water pump that circulates cooling water in the cooling water circuit, the cooling water circuit being configured to cool an in-vehicle electric component; a second refrigerant circuit including a second compressor that compresses second refrigerant and circulates the second refrigerant in the second refrigerant circuit, a second refrigerant/outside air heat exchanger that exchanges heat between the second refrigerant and outside air, and a second expansion valve, the second refrigerant circuit being configured to control a temperature of an in-vehicle battery; a first refrigerant/cooling water heat exchanger connected to the first refrigerant circuit and the cooling water circuit, the first refrigerant/cooling water heat exchanger being configured to exchange heat between the first refrigerant and the cooling water; a second refrigerant/cooling water heat exchanger connected to the second refrigerant circuit and the cooling water circuit, the second refrigerant/cooling water heat exchanger being configured to exchange heat between the second refrigerant and the cooling water; and a control unit configured to control operations of the first refrigerant circuit, the cooling water circuit, and the second refrigerant circuit. The first refrigerant circuit, the cooling water circuit, and the second refrigerant circuit operate in a two-stage heat pump mode where the vehicle interior is heated, by a control of the control unit. In the first refrigerant circuit in the two-stage heat pump mode, the first refrigerant compressed by the first compressor dissipates heat into the inside air at the first refrigerant/inside air heat exchanger serving as a condenser in the first refrigerant circuit, the first refrigerant after dissipating the heat is reduced in pressure at the first expansion valve, the first refrigerant reduced in pressure absorbs heat from the cooling water at the first refrigerant/cooling water heat exchanger serving as an evaporator in the first refrigerant circuit. In the cooling water circuit in the two-stage heat pump mode, the cooling water circulating in the cooling water circuit absorbs heat from the second refrigerant at the second refrigerant/cooling water heat exchanger and dissipates heat into the first refrigerant at the first refrigerant/cooling water heat exchanger. In the second refrigerant circuit in the two-stage heat pump mode, the second refrigerant compressed by the second compressor dissipates heat into the cooling water at the second refrigerant/cooling water heat exchanger serving as a condenser in the second refrigerant circuit, the second refrigerant after dissipating the heat is reduced in pressure at the second expansion valve, and the second refrigerant reduced in pressure absorbs heat from the outside air at the second refrigerant/outside air heat exchanger serving as an evaporator in the second refrigerant circuit.

In this vehicle thermal management system, the first refrigerant circuit, the cooling water circuit, and the second refrigerant circuit operate in the two-stage heat pump mode as follows.

In the second refrigerant circuit that controls the temperature of the in-vehicle battery, the second refrigerant circuit absorbs heat from the outside air at the second refrigerant/outside air heat exchanger serving as the evaporator. The second refrigerant after absorbing the heat is compressed by the second compressor to reach a high temperature, and the second refrigerant dissipates heat into the cooling water at the second refrigerant/cooling water heat exchanger serving as the condenser. The second refrigerant after dissipating the heat is reduced in pressure by the second expansion valve and introduced to the second refrigerant/outside air heat exchanger.

In the cooling water circuit that cools the in-vehicle electric component, the cooling water circulating in the cooling water circuit absorbs heat from the second refrigerant at the second refrigerant/cooling water heat exchanger and also absorbs heat from the in-vehicle electric component, and dissipates heat into the first refrigerant at the first refrigerant/cooling water heat exchanger.

In the first refrigerant circuit that performs air conditioning of the vehicle interior, the first refrigerant absorbs heat from the cooling water at the first refrigerant/cooling water heat exchanger serving as the evaporator. The first refrigerant after absorbing heat, which has been heated by the cooling water, is compressed by the first compressor to further reach a high temperature, and dissipates heat into inside air at the first refrigerant/inside air heat exchanger to heat the vehicle interior. The first refrigerant after dissipating the heat is reduced in pressure at the first expansion valve, and introduced into the first refrigerant/cooling water heat exchanger.

Thus, in the two-stage heat pump mode, aerothermal energy obtained by absorbing heat from the outside air in the second refrigerant circuit and exhaust heat from the in-vehicle electric component obtained by absorbing heat from the in-vehicle electric component in the cooling water circuit are used as heat sources, and the refrigerant is compressed twice in the two refrigerant circuits, so that the first refrigerant in the first refrigerant circuit is effectively heated to reach a high temperature. Accordingly, even when the temperature outside is low in cold regions or the like, the vehicle interior is effectively heated by the first refrigerant circuit in accordance with heating performances of the first refrigerant circuit and the second refrigerant circuit.

On the other hand, in this vehicle thermal management system, the in-vehicle battery is cooled by the second refrigerant circulating in the second refrigerant circuit in accordance with a cooling performance of the second refrigerant circuit, so that the in-vehicle battery is suitably cooled.

Thus, according to this vehicle thermal management, in a battery-mounted vehicle, it is possible to suitably perform cooling of the battery and the electric component, suitably perform air-conditioning of the vehicle interior, and also heat the vehicle interior effectively even when the temperature outside is low in the cold regions or the like.

The first refrigerant circuit preferably includes a third expansion valve and an inside air chiller that exchanges heat between the first refrigerant and the inside air, the cooling water circuit preferably includes a radiator that exchanges heat between the cooling water and the outside air, and the second refrigerant circuit preferably includes a fourth expansion valve and a battery heat exchanger that exchanges heat between the second refrigerant and the in-vehicle battery.

The control unit is preferably configured to switch between a first normal mode where the first refrigerant/inside air heat exchanger exchanges heat between the first refrigerant and the inside air, and the first refrigerant is expanded at the first expansion valve and a first stop mode where the first refrigerant circulates in a state in which heat exchange between the first refrigerant and the inside air at the first refrigerant/inside air heat exchanger is stopped, and expansion at the first expansion valve is stopped.

The control unit is preferably configured to switch between a second normal mode where the inside air chiller exchanges heat between the first refrigerant and the inside air, and the first refrigerant is expanded at the third expansion valve and a second stop mode where the first refrigerant circulates in a state in which heat exchange between the first refrigerant and the inside air at the inside air chiller is stopped, and expansion at the third expansion valve is stopped.

The control unit is preferably configured to switch between a third normal mode where the radiator exchanges heat between the cooling water and the outside air and a third stop mode where the cooling water circulates in a state in which heat exchange between the cooling water and the outside air at the radiator is stopped.

The control unit is preferably configured to switch between a fourth normal mode where the battery heat exchanger exchanges heat between the second refrigerant and the in-vehicle battery, and the second refrigerant is expanded at the fourth expansion valve and a fourth stop mode where the second refrigerant circulates in a state in which heat exchange between the second refrigerant and the in-vehicle battery at the battery heat exchanger is stopped, and expansion at the fourth expansion valve is stopped.

The control unit is preferably configured to switch between a fifth normal mode where the second refrigerant/ cooling water heat exchanger exchanges heat between the second refrigerant and the cooling water, and the second refrigerant is expanded at the second expansion valve and a fifth stop mode where the second refrigerant circulates in a state in which heat exchange between the second refrigerant and the cooling water at the second refrigerant/cooling water heat exchanger is stopped, and expansion at the second expansion valve is stopped.

The first normal mode, the second stop mode, the third stop mode, the fourth stop mode, and the fifth normal mode are preferably set in operation in the two-stage heat pump mode by the control unit.

In the two-stage heat pump mode, the second refrigerant circuit including the fourth expansion valve and the battery heat exchanger operates in the fourth stop mode where the second refrigerant circulates in the state in which heat exchange between the second refrigerant and the in-vehicle battery at the battery heat exchanger is stopped, and expansion at the fourth expansion valve is stopped and in the fifth normal mode where the second refrigerant/cooling water heat exchanger exchanges heat between the second refrigerant and the cooling water, and the second refrigerant is expanded at the second expansion valve. With this operation, the second refrigerant circulating in the second refrigerant circuit absorbs heat from the outside air at the second refrigerant/outside air heat exchanger serving as the evaporator and dissipates heat into the cooling water at the second refrigerant/cooling water heat exchanger serving as the condenser to heat the cooling water.

In the two-stage heat pump mode, the cooling water circuit including the radiator operates in the third stop mode where the cooling water circulates in the state in which heat exchange between the cooling water and the outside air at the radiator is stopped. With this operation, the cooling water circulating in the cooling water circuit does not dissipate the heat absorbed from the second refrigerant at the second refrigerant/cooling water heat exchanger into the outside air at the radiator, and dissipates the heat into the first refrigerant at the first refrigerant/cooling water heat exchanger.

In the two-stage heat pump mode, the first refrigerant circuit including the third expansion valve and the inside air chiller operates in the first normal mode where the first refrigerant/inside air heat exchanger exchanges heat between the first refrigerant and the inside air, and the first refrigerant is expanded at the first expansion valve and in the second stop mode where the first refrigerant circulates in the state in which heat exchange between the first refrigerant and the inside air at the inside air chiller is stopped, and expansion at the third expansion valve is stopped. With this operation, the first refrigerant circulating in the first refrigerant circuit absorbs heat from the cooling water at the first refrigerant/cooling water heat exchanger serving as the evaporator and dissipates heat into the inside air at the first refrigerant/inside air heat exchanger serving as the condenser to heat the vehicle interior.

Thus, the second refrigerant circuit operates in the fourth stop mode and in the fifth normal mode, the cooling water circuit operates in the third stop mode, and the first refrigerant circuit operates in the first normal mode and the second stop mode. As a result, the first refrigerant circuit, the cooling water circuit, and the second refrigerant circuit operate in the two-stage heat pump mode, so that the vehicle interior is effectively heated and the in-vehicle electronic component is suitably cooled.

The first refrigerant circuit and the cooling water circuit preferably operate in a vehicle interior cooling mode where the vehicle interior is cooled, by a control of the control unit.

The first stop mode, the second normal mode, and the third normal mode are preferably set in operation in the vehicle interior cooling mode by the control unit.

In the first refrigerant circuit in the vehicle interior cooling mode, it is preferable that the first refrigerant compressed by the first compressor dissipates heat into the cooling water at the first refrigerant/cooling water heat exchanger serving as a condenser in the first refrigerant circuit, the first refrigerant after dissipating the heat is reduced in pressure at the third expansion valve, and the first refrigerant reduced in pressure absorbs heat from the inside air at the inside air chiller serving as an evaporator in the first refrigerant circuit.

In the cooling water circuit in the vehicle interior cooling mode, it is preferable that the cooling water circulating in the cooling water circuit absorbs heat from the first refrigerant at the first refrigerant/cooling water heat exchanger and dissipates heat into the outside air at the radiator.

The first refrigerant circuit operates in the first stop mode where the first refrigerant circulates in the state in which heat exchange between the first refrigerant and the inside air at the first refrigerant/inside air heat exchanger is stopped, and expansion at the first expansion valve is stopped and in the second normal mode where the inside air chiller exchanges heat between the first refrigerant and the inside air, and the first refrigerant is expanded at the third expansion valve, by the control unit. With this operation, the first refrigerant circulating in the first refrigerant circuit dissipates heat into the cooling water at the first refrigerant/cooling water heat exchanger serving as the condenser and absorbs heat from the inside air at the inside air chiller serving as the evaporator to cool the vehicle interior.

The cooling water circuit operates in the third normal mode where the radiator exchanges heat between the cooling water and the outside air, by the control unit. With this operation, the cooling water circulating in the cooling water circuit dissipates the heat absorbed from the first refrigerant at the first refrigerant/cooling water heat exchanger into the outside air at the radiator to cool the cooling water.

Thus, the first refrigerant circuit operates in the first stop mode and the second normal mode, so that the vehicle interior is cooled. In addition, the cooling water circuit operates in the third normal mode, so that the cooling water dissipates heat into the outside air. As a result, it is suppressed that a temperature of the cooling water, which has absorbed heat from the first refrigerant, is excessively high.

The second refrigerant circuit preferably includes a direction switching unit that reverses a circulation direction of the second refrigerant.

The second refrigerant circuit preferably operates in a battery cooling mode where the in-vehicle battery is cooled, by a control of the control unit.

The fourth normal mode and the fifth stop mode are preferably set in operation in the battery cooling mode by the control unit, and the control unit preferably controls the circulation direction of the second refrigerant with the direction switching unit such that the second refrigerant compressed by the second compressor flows toward the second refrigerant/outside air heat exchanger in the second refrigerant circuit.

In the second refrigerant circuit in the battery cooling mode, it is preferable that the second refrigerant compressed by the second compressor dissipates heat into the outside air at the second refrigerant/outside air heat exchanger serving as a condenser in the second refrigerant circuit, the second refrigerant after dissipating the heat is reduced in pressure at the fourth expansion valve, and the second refrigerant reduced in pressure absorbs heat from the in-vehicle battery at the battery heat exchanger serving as an evaporator in the second refrigerant circuit.

The circulation direction of the second refrigerant is controlled by the direction switching unit such that the second refrigerant compressed by the second compressor flows toward the second refrigerant/outside air heat exchanger in the second refrigerant circuit, and the second refrigerant circuit operates in the fourth normal mode where the battery heat exchanger exchanges heat between the second refrigerant and the in-vehicle battery, and the second refrigerant is expanded at the fourth expansion valve and in the fifth stop mode where the second refrigerant circulates in the state in which heat exchange between the second refrigerant and the cooling water at the second refrigerant/cooling water heat exchanger is stopped, and expansion at the second expansion valve is stopped. With these control and operation, the second refrigerant circulating in the second refrigerant circuit dissipates heat into the outside air at the second refrigerant/outside air heat exchanger and absorbs heat from the in-vehicle battery at the battery heat exchanger serving as the evaporator to cool the in-vehicle battery.

The second refrigerant circuit preferably operates in a battery warm-up mode where the in-vehicle battery is heated, by a control of the control unit.

The fourth normal mode and the fifth stop mode are preferably set in operation in the battery warm-up mode by the control unit, and the control unit preferably controls the circulation direction of the second refrigerant with the direction switching unit such that the second refrigerant compressed by the second compressor flows toward the battery heat exchanger in the second refrigerant circuit.

In the second refrigerant circuit in the battery warm-up mode, it is preferable that the second refrigerant compressed by the second compressor dissipates heat into the in-vehicle battery at the battery heat exchanger serving as a condenser in the second refrigerant circuit, the second refrigerant after dissipating the heat is reduced in pressure at the fourth expansion valve, and the second refrigerant reduced in pressure absorbs heat from the outside air at the second refrigerant/outside air heat exchanger serving as an evaporator in the second refrigerant circuit.

The circulation direction of the second refrigerant is controlled by the direction switching unit such that the second refrigerant compressed by the second compressor flows toward the battery heat exchanger in the second refrigerant circuit, and the second refrigerant circuit operates in the fourth normal mode where the battery heat exchanger exchanges heat between the second refrigerant and the in-vehicle battery, and the second refrigerant is expanded at the fourth expansion valve and in the fifth stop mode where the second refrigerant circulates in the state in which heat exchange between the second refrigerant and the cooling water at the second refrigerant/cooling water heat exchanger is stopped, and expansion at the second expansion valve is stopped. With these control and operation, the second refrigerant circulating in the second refrigerant circuit absorbs heat from the outside air at the second refrigerant/outside air heat exchanger serving as the evaporator and dissipates heat into the in-vehicle battery at the battery heat exchanger serving as the condenser to heat the in-vehicle battery.

The first refrigerant circuit preferably includes a first refrigerant/inside air heat exchanger bypass that bypasses the first refrigerant/inside air heat exchanger and the first expansion valve and a first refrigerant/inside air heat exchanger bypass switching unit that switches the flow of the first refrigerant between toward the first refrigerant/inside air heat exchanger and the first expansion valve and toward the first refrigerant/inside air heat exchanger bypass.

The control unit preferably controls the first refrigerant/inside air heat exchanger bypass switching unit such that the first refrigerant flows toward the first refrigerant/inside air heat exchanger and the first expansion valve in the first normal mode, and the control unit preferably controls the first refrigerant/inside air heat exchanger bypass switching unit such that the first refrigerant flows toward the first refrigerant/inside air heat exchanger bypass in the first stop mode.

When the first refrigerant circuit including the first refrigerant/inside air heat exchanger bypass and the first refrigerant/inside air heat exchanger bypass switching unit operates in the first normal mode, the first refrigerant flows toward the first refrigerant/inside air heat exchanger and the first expansion valve by the first refrigerant/inside air heat exchanger bypass switching unit. With this operation, the first refrigerant/inside air heat exchanger serves as the condenser where the first refrigerant dissipates heat into the inside air, in the two-stage heat pump mode. In addition, when the first refrigerant circuit operates in the first stop mode, the first refrigerant flows toward the first refrigerant/inside air heat exchanger bypass by the first refrigerant/inside air heat exchanger bypass switching unit. With this operation, the first refrigerant/inside air heat exchanger stops to work in the vehicle interior cooling mode.

The first refrigerant circuit preferably includes an inside air chiller bypass that bypasses the inside air chiller and the third expansion valve and an inside air chiller bypass switching unit that switches the flow of the first refrigerant between toward the inside air chiller and the third expansion valve and toward the inside air chiller bypass.

The control unit preferably controls the inside air chiller bypass switching unit such that the first refrigerant flows through the inside air chiller and the third expansion valve in the second normal mode, and the control unit preferably controls the inside air chiller bypass switching unit such that the first refrigerant flows through the inside air chiller bypass in the second stop mode.

When the first refrigerant circuit including the inside air chiller bypass and the inside air chiller bypass switching unit operates in the second normal mode, the first refrigerant flows toward the inside air chiller and the third expansion valve by the inside air chiller bypass switching unit. With this operation, the inside air chiller serves as the evaporator where the first refrigerant absorbs heat from the inside air in the vehicle interior cooling mode. In addition, when the first refrigerant circuit operates in the second stop mode, the first refrigerant flows toward the inside air chiller bypass by the inside air chiller bypass switching unit. With this operation, the inside air chiller stops to work in the two-stage heat pump mode.

The cooling water circuit preferably includes a radiator bypass that bypasses the radiator and a radiator bypass switching unit that switches the flow of the cooling water between toward the radiator and toward the radiator bypass.

The control unit preferably controls the radiator bypass switching unit such that the cooling water flows through the radiator in the third normal mode, and the control unit preferably controls the radiator bypass switching unit such that the cooling water flows through the radiator bypass in the third stop mode.

When the cooling water circuit including the radiator bypass and the radiator bypass switching unit operates in the third normal mode, the cooling water flows toward the radiator by the radiator bypass switching unit. With this operation, the radiator serves as a dissipation unit where the cooling water dissipates heat into the outside air. In addition, when the cooling water circuit operates in the third stop mode, the cooling water flows toward the radiator bypass by the radiator bypass switching unit. With this operation, the radiator stops to work in the two-stage heat pump mode.

The second refrigerant circuit preferably includes a battery heat exchanger bypass that bypasses the battery heat exchanger and the fourth expansion valve and a battery heat exchanger bypass switching unit that switches the flow of the second refrigerant between toward the battery heat exchanger and the fourth expansion valve and toward the battery heat exchanger bypass.

The control unit preferably controls the battery heat exchanger bypass switching unit such that the second refrigerant flows toward the battery heat exchanger and the fourth expansion valve in the fourth normal mode, and the control unit preferably controls the battery heat exchanger bypass switching unit such that the second refrigerant flows toward the battery heat exchanger bypass in the fourth stop mode.

When the second refrigerant circuit including the battery heat exchanger bypass and the battery heat exchanger bypass switching unit operates in the fourth normal mode, the second refrigerant flows toward the battery heat exchanger and the fourth expansion valve by the battery heat exchanger bypass switching unit. With this operation, the battery heat exchanger serves as the evaporator where the second refrigerant absorbs heat from the in-vehicle battery in the battery cooling mode, and the battery heat exchanger serves as the condenser where the second refrigerant dissipates heat into the in-vehicle battery in the battery warm-up mode. In addition, when the second refrigerant circuit operates in the fourth stop mode, the second refrigerant flows toward the battery heat exchanger bypass by the battery heat exchanger bypass switching unit. With this operation, the battery heat exchanger stops to work in the two-stage heat pump mode.

The second refrigerant circuit preferably includes a second refrigerant/cooling water heat exchanger bypass that bypasses the second refrigerant/cooling water heat exchanger and the second expansion valve and a second refrigerant/cooling water heat exchanger bypass switching unit that switches the flow of the second refrigerant between toward the second refrigerant/cooling water heat exchanger and the second expansion valve and toward the second refrigerant/cooling water heat exchanger bypass.

The control unit preferably controls the second refrigerant/cooling water heat exchanger bypass switching unit such that the second refrigerant flows toward the second refrigerant/cooling water heat exchanger and the second expansion valve in the fifth normal mode, and the control unit preferably controls the second refrigerant/cooling water heat exchanger bypass switching unit such that the second refrigerant flows toward the second refrigerant/cooling water heat exchanger bypass in the fifth stop mode.

When the second refrigerant circuit including the second refrigerant/cooling water heat exchanger bypass and the second refrigerant/cooling water heat exchanger bypass switching unit operates in the fifth normal mode, the second refrigerant flows toward the second refrigerant/cooling water heat exchanger and the second expansion valve by the second refrigerant/cooling water heat exchanger bypass switching unit. With this operation, the second refrigerant/cooling water heat exchanger serves as the condenser where the second refrigerant dissipates heat into the cooling water. In addition, when the second refrigerant circuit operates in the fifth stop mode, the second refrigerant flows toward the second refrigerant/cooling water heat exchanger bypass by the second refrigerant/cooling water heat exchanger bypass switching unit. With this operation, the second refrigerant/cooling water heat exchanger stops to work in the battery cooling mode and the battery warm-up mode.

Advantageous Effect of the Disclosure

According to the vehicle thermal management system of the present invention, it is possible to suitably cool the in-vehicle battery and suitably perform air-conditioning of the vehicle interior in the battery-mounted vehicle, and also heat the vehicle interior effectively even when the temperature outside is low in cold regions or the like.

BRIEF DESCRIPTION OF DRAWINGS

FIG. 8 is a system configuration diagram for explaining a vehicle interior heating/battery cooling mode in the vehicle thermal management system according to the embodiment.

DESCRIPTION OF EMBODIMENTS

The following will describe an embodiment of the present invention with reference to the drawings. The vehicle thermal management system in the embodiment is mounted on a battery-mounted vehicle that obtains a driving power for traveling from an electric motor. Examples of the battery-mounted vehicle include an electric vehicle and a plug-in hybrid vehicle. The vehicle thermal management system in the embodiment is configured to perform air conditioning of the vehicle interior, control a temperature of an in-vehicle battery, and cool in-vehicle electric components.

Embodiment

Figure 1:
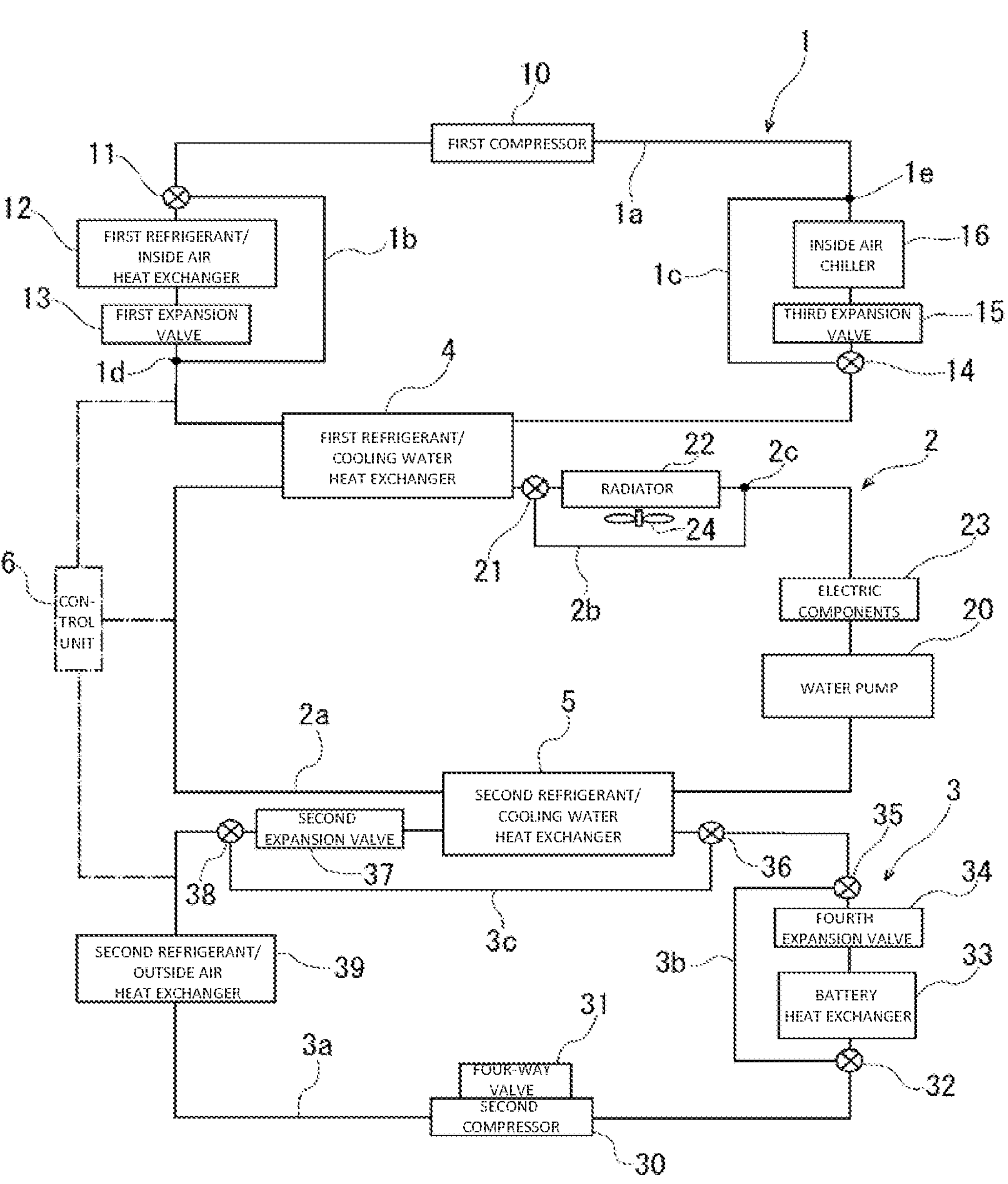
FIG. 1 is a system configuration diagram schematically illustrating an overall configuration of a vehicle thermal management system according to an embodiment.

This vehicle thermal management system having an overall configuration schematically illustrated in FIG. 1 includes a first refrigerant circuit 1, a cooling water circuit 2, a second refrigerant circuit 3, a first refrigerant/cooling water heat exchanger 4, a second refrigerant/cooling water heat exchanger 5, and a control unit 6.

The first refrigerant/cooling water heat exchanger 4 is incorporated in both the first refrigerant circuit 1 and the cooling water circuit 2, and connects the first refrigerant circuit 1 to the cooling water circuit 2. The second refrigerant/cooling water heat exchanger 5 is incorporated in both the cooling water circuit 2 and the second refrigerant circuit 3, and connects the cooling water circuit 2 to the second refrigerant circuit 3.

The first refrigerant circuit 1 performs air conditioning of a vehicle interior by heat exchange between first refrigerant R1 circulating in the first refrigerant circuit 1 and inside air supplied to the vehicle interior. In addition, the first refrigerant circuit 1 cools or heats cooling water L by heat exchange between the first refrigerant R1 circulating in the first refrigerant circuit 1 and the cooling water L circulating in the cooling water circuit 2, that is, by absorbing heat from the cooling water L or dissipating heat into the cooling water L.

The first refrigerant circuit 1 is configured so as to be switchable between a vehicle interior heating/cooling water cooling circuit where the vehicle interior is heated by heating the inside air and heat is absorbed from the cooling water L and a vehicle interior cooling/cooling water heating circuit where the vehicle interior is cooled by cooling the inside air and heat is dissipated into the cooling water L. The cooling of the vehicle interior by cooling the inside air includes dehumidifying the inside air in the vehicle interior.

The first refrigerant circuit 1 is formed of a first refrigerant pipeline 1*a*, a first refrigerant/inside air heat exchanger bypass pipeline 1*b* as a first refrigerant/inside air heat exchanger bypass, and an inside air chiller bypass pipeline 1*c* as an inside air chiller bypass.

The first refrigerant circuit 1 includes a first compressor 10, a first three-way valve 11, a first refrigerant/inside air heat exchanger 12, a first expansion valve 13, a second three-way valve 14, a third expansion valve 15, and an inside air chiller 16, which are arranged in this order in the first refrigerant pipeline 1*a*. The first refrigerant/cooling water heat exchanger 4 is incorporated between the first expansion valve 13 and the second three-way valve 14.

The first compressor 10 and a second compressor 30, which is described later, each correspond to an electric compressor where a refrigerant discharge performance is controlled by control signals output from the control unit 6. The first compressor 10 compresses the first refrigerant R1 to circulate the first refrigerant R1 in the first refrigerant circuit 1. A circulation direction of the first refrigerant R1 in the first refrigerant circuit 1 is a counterclockwise direction in FIG. 1. That is, the first refrigerant R1 compressed by the first compressor 10 flows toward the first three-way valve 11.

One end of the first refrigerant/inside air heat exchanger bypass pipeline 1*b* is connected to the first three-way valve 11, and the other end of the first refrigerant/inside air heat exchanger bypass pipeline 1*b* is connected to a first connection portion 1*d* in the first refrigerant pipeline 1*a*, which is located between the first expansion valve 13 and the first refrigerant/cooling water heat exchanger 4. The first refrigerant/inside air heat exchanger bypass pipeline 1*b* bypasses the first refrigerant/inside air heat exchanger 12 and the first expansion valve 13. One end of the inside air chiller bypass pipeline 1*c* is connected to the second three-way valve 14, and the other end of the inside air chiller bypass pipeline 1*c* is connected to a second connection portion 1*e* in the first refrigerant pipeline 1*a*, which is located between the inside air chiller 16 and the first compressor 10. The inside air chiller bypass pipeline 1*c* bypasses the inside air chiller 16 and the third expansion valve 15.

The first three-way valve 11, the second three-way valve 14, a third three-way valve 21, a fourth three-way valve 32, a fifth three-way valve 35, a sixth three-way valve 36, and a seventh three-way valve 38 are motorized three-way valves that switch pipelines through which the refrigerant flows in response to control signals from the control unit 6. The third three-way valve 21, the fourth three-way valve 32, the fifth three-way valve 35, the sixth three-way valve 36, and the seventh three-way valve 38 are described later.

The first three-way valve 11 corresponds to a first refrigerant/inside air heat exchanger bypass switching unit that switches the flow of the first refrigerant R1 between toward the first refrigerant/inside air heat exchanger 12 and the first expansion valve 13 and toward the first refrigerant/inside air heat exchanger bypass pipeline 1*b*. The second three-way valve 14 corresponds to an inside air chiller bypass switching unit that switches the flow of the first refrigerant R1 between toward the inside air chiller 16 and the third expansion valve 15 and toward the inside air chiller bypass pipeline 1*c*.

In the first refrigerant circuit 1, the first refrigerant/inside air heat exchanger 12 and the inside air chiller 16 exchange heat between the first refrigerant R1 and inside air supplied to the vehicle interior by a blower fan, which is not illustrated. When the first refrigerant/inside air heat exchanger 12 serves as a condenser in the first refrigerant circuit 1, the first refrigerant R1 dissipates heat into the inside air at the first refrigerant/inside air heat exchanger 12. The inside air heated by the heat exchange with the first refrigerant R1 is supplied to the vehicle interior by the blower fan, which is not illustrated, to heat the vehicle interior. When the first refrigerant R1 flows through the first refrigerant/inside air heat exchanger bypass pipeline 1*b*, the first refrigerant/inside air heat exchanger 12 stops to work. When the inside air chiller 16 serves as an evaporator in the first refrigerant circuit 1, the first refrigerant R1 absorbs heat from the inside air at the inside air chiller 16. The inside air cooled by the heat exchange with the first refrigerant R1 is supplied to the vehicle interior by the blower fan, which is not illustrated, to cool the vehicle interior. When the first refrigerant R1 flows through the inside air chiller bypass pipeline 1*c*, the inside air chiller 16 stops to work.

The cooling water circuit 2 cools the in-vehicle electric components by heat exchange between the cooling water L circulating the cooling water circuit 2 and the in-vehicle electric components. The cooling water circuit 2 heats or cools the cooling water L by heat exchange between the cooling water L circulating in the cooling water circuit 2 and outside air, that is, by absorbing heat from the outside air or by dissipating heat into the outside air. In the cooling water circuit 2, the heat exchange between the cooling water L circulating in the cooling water circuit 2 and the outside air is controlled, and thus, heat dissipation from the cooling water L to the outside air and heat absorption from the outside air to the cooling water L are controlled. The cooling water circuit 2 is configured so as to be switchable between a heat dissipation circuit where the cooling water L dissipates heat into the outside air and a non-heat dissipation circuit where the cooling water L does not dissipate heat into the outside air. The non-heat dissipation circuit includes a circuit where the cooling water L does not dissipate heat into the outside air but only absorbs heat from the outside air.

The cooling water circuit 2 is formed of a cooling water pipeline 2*a* and a radiator bypass pipeline 2*b* as a radiator bypass. The cooling water L circulates in the cooling water circuit 2 to cool the in-vehicle electric components. Examples of the in-vehicle electric components include a traveling motor for driving a vehicle and a PCU.

The cooling water circuit 2 includes a water pump 20, the third three-way valve 21, a radiator 22, and electric components 23, which are arranged in this order in the cooling water pipeline 2*a*. The cooling water pipeline 2*a* is connected to a cooling passage that is located inside or adjacent to the in-vehicle electric components, and the cooling water L flows through the cooling passage for the in-vehicle electric components at the electric components 23 to cool the in-vehicle electric components.

In the cooling water circuit 2, the second refrigerant/cooling water heat exchanger 5 and the first refrigerant/cooling water heat exchanger 4 are incorporated in this order between the water pump 20 and the third three-way valve 21. A circulation direction of the cooling water L in the cooling water circuit 2 is a clockwise direction in FIG. 1. That is, the cooling water L pumped by the water pump 20 flows through the second refrigerant/cooling water heat exchanger 5 and the first refrigerant/cooling water heat exchanger 4 in this order to the third three-way valve 21. The cooling water in the present specification includes so-called coolant (LLC: Long Life Coolant).

One end of the radiator bypass pipeline 2*b* is connected to the third three-way valve 21, and the other end of the radiator bypass pipeline 2*b* is connected to a third connection portion 2*c* in the cooling water pipeline 2*a*, which is located between the radiator 22 and the electric components 23. The radiator bypass pipeline 2*b* bypasses the radiator 22. A cooling fan 24 that blows the outside air to the radiator 22 is provided near the radiator 22.

The third three-way valve 21 corresponds to a radiator bypass switching unit that switches the flow of the cooling water L between toward the radiator 22 and toward the radiator bypass pipeline 2*b*.

In the cooling water circuit 2, the radiator 22 exchanges heat between the outside air supplied by the cooling fan 24 and the cooling water L. When the cooling water L flows through the radiator bypass pipeline 2*b*, the radiator 22 stops to work. Even when the cooling water L flows through the radiator 22, the radiator 22 does not substantially exchange heat between the cooling water L and the outside air as long as the cooling fan 24 stops to work.

The second refrigerant circuit 3 controls a temperature of an in-vehicle battery by heat exchange between second refrigerant R2 circulating in the second refrigerant circuit 3 and the in-vehicle battery. In addition, the second refrigerant circuit 3 heats the cooling water L by heat exchange between the second refrigerant R2 circulating in the second refrigerant circuit 3 and the cooling water L circulating in the cooling water circuit 2, that is, by dissipating heat into the cooling water L. The second refrigerant circuit 3 is configured so as to be switchable among a cooling water heating circuit where heat is absorbed from the outside air and dissipated into the cooling water L to heat the cooling water L while the temperature control of the in-vehicle battery is not performed, a battery warm-up circuit where heat is absorbed from the outside air to heat the in-vehicle battery, and a battery cooling circuit where heat is dissipated into the outside air to cool the in-vehicle battery.

The second refrigerant circuit 3 is formed of a second refrigerant pipeline 3*a*, a battery heat exchanger bypass pipeline 3*b*, and a second refrigerant/cooling water heat exchanger bypass pipeline 3*c*.

The second refrigerant circuit 3 includes the second compressor 30, a four-way valve 31, the fourth three-way valve 32, a battery heat exchanger 33, a fourth expansion valve 34, the fifth three-way valve 35, the sixth three-way valve 36, a second expansion valve 37, the seventh three-way valve 38, and a second refrigerant/outside air heat exchanger 39, which are arranged in this order in the second refrigerant pipeline 3*a*. The second refrigerant/cooling water heat exchanger 5 is incorporated between the sixth three-way valve 36 and the second expansion valve 37.

The second compressor 30 compresses the second refrigerant R2 to circulate the second refrigerant R2 in the second refrigerant circuit 3. A circulation direction of the second refrigerant R2 in the second refrigerant circuit 3 is reversed by the four-way valve 31, and thus, the second refrigerant R2 circulates in a clockwise direction and in a counterclockwise direction in FIG. 1 in the second refrigerant circuit 3.

The four-way valve 31 is a motorized four-way valve that switches between a first state and a second state in response to control signals from the control unit 6, and corresponds to a direction switching unit that reverses the circulation direction in which the second refrigerant R2 circulates in the second refrigerant pipeline 3*a*.

The four-way valve 31 in the first state connects a suction port of the second compressor 30 to the second refrigerant/outside air heat exchanger 39, and connects a discharge port of the second compressor 30 to the battery heat exchanger 33. When the four-way valve 31 is in the first state, the circulation direction of the second refrigerant R2 in the second refrigerant circuit 3 is set in the counterclockwise direction in FIG. 1, and then, the second refrigerant R2 compressed by the second compressor 30 flows toward the battery heat exchanger 33. The four-way valve 31 in the second state connects the suction port of the second compressor 30 to the battery heat exchanger 33, and connects the discharge port of the second compressor 30 to the second refrigerant/outside air heat exchanger 39. When the four-way valve 31 is in the second state, the circulation direction of the second refrigerant R2 in the second refrigerant circuit 3 is set in the clockwise direction in FIG. 1, and then, the second refrigerant R2 compressed by the second compressor 30 flows toward the second refrigerant/outside air heat exchanger 39.

One end of the battery heat exchanger bypass pipeline 3*b* is connected to the fourth three-way valve 32, and the other end of the battery heat exchanger bypass pipeline 3*b* is connected to the fifth three-way valve 35. The battery heat exchanger bypass pipeline 3*b* corresponds to a battery heat exchanger bypass that bypasses the battery heat exchanger 33 and the fourth expansion valve 34. One end of the second refrigerant/cooling water heat exchanger bypass pipeline 3*c* is connected to the sixth three-way valve 36, and the other end of the second refrigerant/cooling water heat exchanger bypass pipeline 3*c* is connected to the seventh three-way valve 38. The second refrigerant/cooling water heat exchanger bypass pipeline 3*c* corresponds to a second refrigerant/cooling water heat exchanger bypass that bypasses the second refrigerant/cooling water heat exchanger 5 and the second expansion valve 37.

The fourth three-way valve 32 and the fifth three-way valve 35 each correspond to a battery heat exchanger bypass switching unit that switches the flow of the second refrigerant R2 between toward the battery heat exchanger 33 and the fourth expansion valve 34 and toward the battery heat exchanger bypass pipeline 3*b*. The sixth three-way valve 36 and the seventh three-way valve 38 each correspond to a second refrigerant/cooling water heat exchanger bypass switching unit that switches the flow of the second refrigerant R2 between toward the second refrigerant/cooling water heat exchanger 5 and the second expansion valve 37 and toward the second refrigerant/cooling water heat exchanger bypass pipeline 3*c*.

In the second refrigerant circuit 3, the battery heat exchanger 33 exchanges heat between the second refrigerant R2 and the in-vehicle battery. When the battery heat exchanger 33 serves as an evaporator in the second refrigerant circuit 3, the second refrigerant R2 absorbs heat from the in-vehicle battery at the battery heat exchanger 33 to cool the in-vehicle battery. When the battery heat exchanger 33 serves as a condenser for the second refrigerant circuit 3, the second refrigerant R2 dissipates heat into the in-vehicle battery at the battery heat exchanger 33 to warm up the in-vehicle battery. When the second refrigerant R2 flows through the battery heat exchanger bypass pipeline 3*b*, the battery heat exchanger 33 stops to work.

The second refrigerant pipeline 3*a* is connected to a temperature control passage that is located inside or adjacent to the in-vehicle battery, and the second refrigerant R2 flows through the temperature control passage of the in-vehicle battery in the battery heat exchanger 33 to control the temperature of the in-vehicle battery.

In the second refrigerant circuit 3, the second refrigerant/outside air heat exchanger 39 exchanges heat between the second refrigerant R2 and the outside air supplied by a blower fan, which is not illustrated. When the second refrigerant/outside air heat exchanger 39 serves as an evaporator in the second refrigerant circuit 3, the second refrigerant R2 absorbs heat from the outside air at the second refrigerant/outside air heat exchanger 39. When the second refrigerant/outside air heat exchanger 39 serves as a condenser in the second refrigerant circuit 3, the second refrigerant R2 dissipates heat into the outside air at the second refrigerant/outside air heat exchanger 39.

The first refrigerant/cooling water heat exchanger 4 exchanges heat between the first refrigerant R1 circulating in the first refrigerant circuit 1 and the cooling water L circulating in the cooling water circuit 2. When the first refrigerant/cooling water heat exchanger 4 serves as an evaporator in the first refrigerant circuit 1, the first refrigerant R1 absorbs heat from the cooling water L at the first refrigerant/cooling water heat exchanger 4. When the first refrigerant/cooling water heat exchanger 4 serves as a condenser in the first refrigerant circuit 1, the first refrigerant R1 dissipates heat into the cooling water L at the first refrigerant/cooling water heat exchanger 4.

The second refrigerant/cooling water heat exchanger 5 exchanges heat between the second refrigerant R2 circulating in the second refrigerant circuit 3 and the cooling water L circulating in the cooling water circuit 2. When the second refrigerant/cooling water heat exchanger 5 serves as a condenser in the second refrigerant circuit 3, the second refrigerant R2 dissipates heat into the cooling water L at the second refrigerant/cooling water heat exchanger 5. When the second refrigerant R2 flows through the second refrigerant/cooling water heat exchanger bypass pipeline 3*c*, the second refrigerant/cooling water heat exchanger 5 stops to work.

The control unit 6 is formed of an electronic control device, and is configured to control operations of the first refrigerant circuit 1, the cooling water circuit 2, and the second refrigerant circuit 3.

The control unit 6 controls operations of the first compressor 10, the first three-way valve 11, the second three-way valve 14, and the blower fan, which is not illustrated, in the first refrigerant circuit 1. The control unit 6 controls operations of the water pump 20, the third three-way valve 21, and the cooling fan 24 in the cooling water circuit 2. The control unit 6 controls operations of the second compressor 30, the four-way valve 31, the fourth three-way valve 32, the fifth three-way valve 35, the sixth three-way valve 36, the seventh three-way valve 38, and the blower fan, which is not illustrated, in the second refrigerant circuit 3.

The first refrigerant circuit 1 is controlled by the control unit 6 to switch between a first normal mode and a first stop mode. In the first normal mode, the first three-way valve 11 is controlled by the control unit 6, which causes the first refrigerant R1 to flow through the first refrigerant/inside air heat exchanger 12 and the first expansion valve 13. In the first stop mode, the first three-way valve 11 is controlled by the control unit 6, which causes the first refrigerant R1 to flow through the first refrigerant/inside air heat exchanger bypass pipeline 1*b*.

The first refrigerant circuit 1 is controlled by the control unit 6 to switch between a second normal mode and a second stop mode. In the second normal mode, the second three-way valve 14 is controlled by the control unit 6, which causes the first refrigerant R1 to flow through the inside air chiller 16 and the third expansion valve 15. In the second stop mode, the second three-way valve 14 is controlled by the control unit 6, which causes the first refrigerant R1 to flow through the inside air chiller bypass pipeline 1*c*.

The cooling water circuit 2 is controlled by the control unit 6 to switch between a third normal mode and a third stop mode. In the third normal mode, the third three-way valve 21 is controlled by the control unit 6, which causes the cooling water L to flow through the radiator 22. In the third stop mode, the third three-way valve 21 is controlled by the control unit 6, which causes the cooling water L to flow through the radiator bypass pipeline 2*b*.

The second refrigerant circuit 3 is controlled by the control unit 6 to switch between a fourth normal mode and a fourth stop mode. In the fourth normal mode, the fourth three-way valve 32 and the fifth three-way valve 35 are controlled by the control unit 6, which causes the second refrigerant R2 to flow through the battery heat exchanger 33 and the fourth expansion valve 34. In the fourth stop mode, the fourth three-way valve 32 and the fifth three-way valve 35 are controlled by the control unit 6, which causes the second refrigerant R2 to flow through the battery heat exchanger bypass pipeline 3*b*.

The second refrigerant circuit 3 is controlled by the control unit 6 to switch between a fifth normal mode and a fifth stop mode. In the fifth normal mode, the sixth three-way valve 36 and the seventh three-way valve 38 are controlled by the control unit 6, which causes the second refrigerant R2 to flow through the second refrigerant/cooling water heat exchanger 5 and the second expansion valve 37. In the fifth stop mode, the sixth three-way valve 36 and the seventh three-way valve 38 are controlled by the control unit 6, which causes the second refrigerant R2 to flow through the second refrigerant/cooling water heat exchanger bypass pipeline 3*c*.

The following will describe an operation of the vehicle thermal management system having the above-described configuration.

(Two-Stage Heat Pump Mode)

Figure 2:
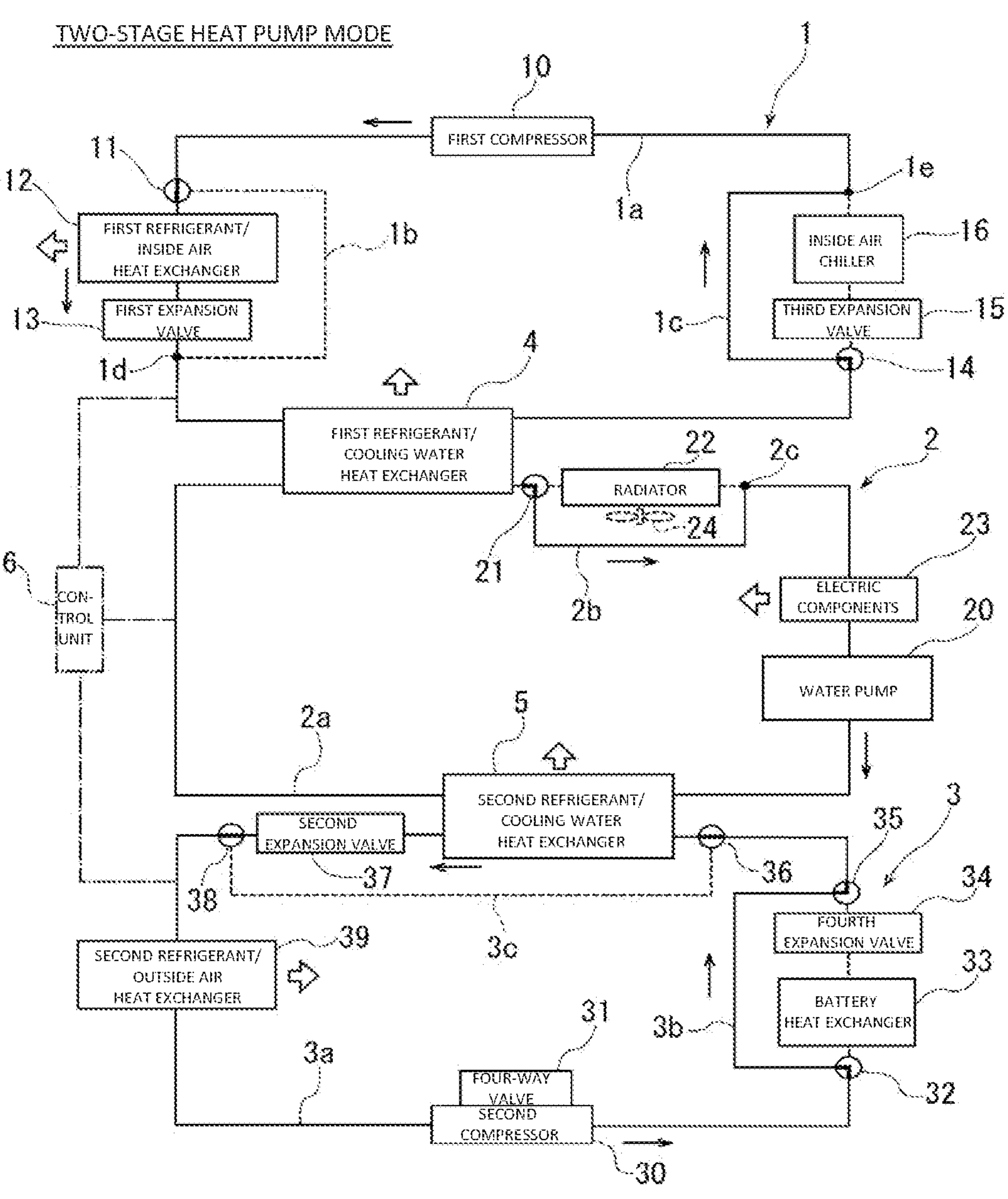
FIG. 2 is a system configuration diagram for explaining a two-stage heat pump mode in the vehicle thermal management system according to the embodiment.

The first refrigerant circuit 1, the cooling water circuit 2, and the second refrigerant circuit 3 operate in a two-stage heat pump mode, which is illustrated in a system configuration of FIG. 2, by a control of the control unit 6. In the two-stage heat pump mode, the first refrigerant circuit 1 that performs air conditioning of the vehicle interior is operated so as to heat the vehicle interior, and the second refrigerant circuit 3 that controls the temperature of the in-vehicle battery is operated so as to heat the cooling water L in the cooling water circuit 2.

In the two-stage heat pump mode, the first normal mode, the second stop mode, the third stop mode, the fourth stop mode, and the fifth normal mode are set in operation.

The second refrigerant circuit 3 in the two-stage heat pump mode serves as the cooling water heating circuit where heat is absorbed from the outside air without the temperature control of the in-vehicle battery and the heat is dissipated into the cooling water L in the cooling water circuit 2 to heat the cooling water L. In the second refrigerant circuit 3 in the two-stage heat pump mode, the circulation direction of the second refrigerant R2 is set in the counterclockwise in FIG. 2 by a control of the four-way valve 31, and thus, the second refrigerant R2 compressed by the second compressor 30 flows toward the battery heat exchanger 33. The second refrigerant circuit 3 in the two-stage heat pump mode operates in the fourth stop mode and the fifth normal mode.

In the second refrigerant circuit 3 in the two-stage heat pump mode, which operates in the fourth stop mode and the fifth normal mode, the second refrigerant R2 compressed by the second compressor 30 flows toward the battery heat exchanger 33 through the four-way valve 31, and then, is introduced into the second refrigerant/cooling water heat exchanger 5 through the battery heat exchanger bypass pipeline 3*b*. The second refrigerant/cooling water heat exchanger 5 serves as the condenser in the second refrigerant circuit 3, and the second refrigerant R2 dissipates heat into the cooling water L in the cooling water circuit 2 at the second refrigerant/cooling water heat exchanger 5. The second refrigerant R2 after dissipating the heat is reduced in pressure by the second expansion valve 37 and introduced to the second refrigerant/outside air heat exchanger 39. The second refrigerant/outside air heat exchanger 39 serves as the evaporator in the second refrigerant circuit 3, and the second refrigerant R2 absorbs heat from the outside air at the second refrigerant/outside air heat exchanger 39. The second refrigerant R2 after absorbing the heat is introduced into the second compressor 30 through the four-way valve 31.

The cooling water circuit 2 in the two-stage heat pump mode serves as the non-heat dissipation circuit where the cooling water L does not dissipate heat to into the outside air at the radiator 22. The cooling water circuit 2 in the two-stage heat pump mode operates in the third stop mode. When the cooling water circuit 2 operates in the third stop mode, the cooling fan 24 for the radiator 22 is preferably stopped.

In the cooling water circuit 2 in the two-stage heat pump mode, which operates in the third stop mode, the cooling water L pumped by the water pump 20 flows through the second refrigerant/cooling water heat exchanger 5, the first refrigerant/cooling water heat exchanger 4, the radiator bypass pipeline 2*b*, and the electric components 23, and then, is introduced into the water pump 20. The cooling water L circulating in the cooling water circuit 2 absorbs heat from the electric components 23 to cool the electric components 23, absorbs heat from the second refrigerant R2 in the second refrigerant circuit 3 at the second refrigerant/cooling water heat exchanger 5, and dissipates heat into the first refrigerant R1 in the first refrigerant circuit 1 at the first refrigerant/cooling water heat exchanger 4.

The cooling water circuit 2 in the two-stage heat pump mode may operate in the third normal mode serving as the heat dissipation circuit where the cooling water L dissipates heat into the outside air at the radiator 22 as appropriate, for example, in a case where the cooling of the electric components 23 is prioritized. The same goes for a vehicle interior heating mode and a vehicle interior heating/battery cooling mode, which are described later.

The first refrigerant circuit 1 in the two-stage heat pump mode serves as the vehicle interior heating/cooling water cooling circuit where the inside air is heated to heat the vehicle interior and heat is absorbed from the cooling water L in the cooling water circuit 2. The first refrigerant circuit 1 in the two-stage heat pump mode operates in the first normal mode and the second stop mode.

In the first refrigerant circuit 1 in the two-stage heat pump mode, which operates in the first normal mode and the second stop mode, the first refrigerant R1 compressed by the first compressor 10 is introduced into the first refrigerant/inside air heat exchanger 12. The first refrigerant/inside air heat exchanger 12 serves as the condenser in the first refrigerant circuit 1, and the first refrigerant R1 dissipates heat into the inside air at the first refrigerant/inside air heat exchanger 12 to heat the vehicle interior. The first refrigerant R1 after dissipating the heat is reduced in pressure at the first expansion valve 13 and introduced to the first refrigerant/cooling water heat exchanger 4. The first refrigerant/cooling water heat exchanger 4 serves as the evaporator in the first refrigerant circuit 1, and the first refrigerant R1 absorbs heat from the cooling water L in the cooling water circuit 2 at the first refrigerant/cooling water heat exchanger 4. The first refrigerant R1 after absorbing the heat is introduced to the first compressor 10 through the inside air chiller bypass pipeline 1*c*.

Thus, in the two-stage heat pump mode, aerothermal energy obtained by absorbing heat from the outside air in the second refrigerant circuit 3 and exhaust heat from the electric components 23 obtained by absorbing heat from the electric components 23 in the cooling water circuit 2 are used as heat sources, and the refrigerant is compressed twice in the first refrigerant circuit 1 and the second refrigerant circuit 3, so that the first refrigerant R1 in the first refrigerant circuit 1 is effectively heated to reach a high temperature. Accordingly, even when the temperature outside is low in cold regions or the like, the vehicle interior is effectively heated by the first refrigerant circuit 1 in accordance with heating performances of the first refrigerant circuit 1 and the second refrigerant circuit 3.

On the other hand, in this vehicle thermal management system, the second refrigerant circuit 3 is operated in a battery cooling mode as described later to cool the in-vehicle battery in accordance with a cooling performance of the second refrigerant circuit 3, so that the in-vehicle battery is suitably cooled.

Thus, according to this vehicle thermal management, it is possible to suitably cool the battery and the electric components and suitably perform air-conditioning of the vehicle interior, and also heat the vehicle interior effectively even when the temperature outside is low in the cold regions or the like.

(Vehicle Interior Heating Mode)

Figure 3:
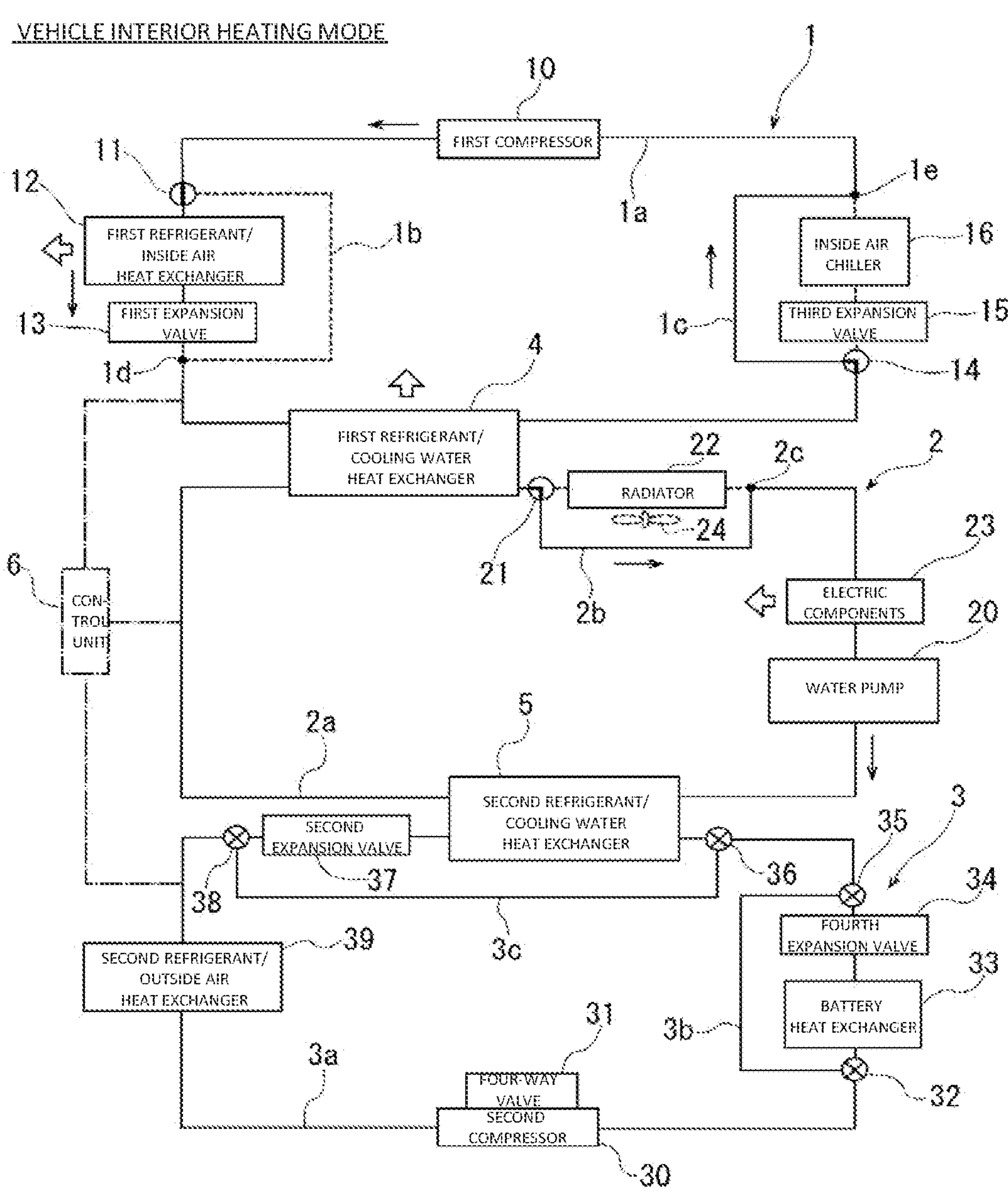
FIG. 3 is a system configuration diagram for explaining a vehicle interior heating mode in the vehicle thermal management system according to the embodiment.

The first refrigerant circuit 1 and the cooling water circuit 2 operates in a vehicle interior heating mode, which is illustrated in a system configuration in FIG. 3, by the control of the control unit 6. In the vehicle interior heating mode, the first normal mode, the second stop mode, and the third stop mode are set in operation.

Similarly to the two-stage heat pump mode, the first refrigerant circuit 1 in the vehicle interior heating mode serves as the vehicle interior heating/cooling water cooling circuit, and operates in the first normal mode and the second stop mode. The first refrigerant R1 circulating in the first refrigerant circuit 1 dissipates heat into the inside air at the first refrigerant/inside air heat exchanger 12 to heat the vehicle interior, and the first refrigerant R1 absorbs heat from the cooling water L in the cooling water circuit 2 at the first refrigerant/cooling water heat exchanger 4.

Similarly to the two-stage heat pump mode, the cooling water circuit 2 in the vehicle interior heating mode serves as the non-heat dissipation circuit where the cooling water L does not dissipate heat into the outside air at the radiator 22. The cooling water circuit 2 in the vehicle interior heating mode operates in the third stop mode. The cooling water L circulating in the cooling water circuit 2 absorbs heat from the electric components 23 to cool the electric components 23, and the cooling water L dissipates the heat into the first refrigerant R1 in the first refrigerant circuit 1 at the first refrigerant/cooling water heat exchanger 4. It is suppressed by the heat dissipation at the first refrigerant/cooling water heat exchanger 4 that the temperature of the cooling water L in the cooling water circuit 2 becomes excessively high. When the temperature outside is higher than the temperature of the cooling water L in the vehicle interior heating mode, the cooling water circuit 2 may serve as the non-heat dissipation circuit where the cooling water L absorbs heat from the outside air at the radiator 22. In this case, the cooling water circuit 2 in the vehicle interior heating mode operates in the third normal mode. After the cooling water L circulating in the cooling water circuit 2 dissipates heat into the first refrigerant R1 at the first refrigerant/cooling water heat exchanger 4, the cooling water L absorbs heat from the outside air at the radiator 22 and also absorbs heat from the electric components 23 to cool the electric components 23. Thus, it is suppressed that the temperature of the cooling water L in the cooling water circuit 2 becomes excessively low.

The cooling water L flows through the second refrigerant/cooling water heat exchanger 5. However, the cooling water L does not substantially dissipate heat into the second refrigerant R2 in the second refrigerant circuit 3 and does not substantially absorb heat from the second refrigerant R2 in the second refrigerant circuit 3 at the second refrigerant/cooling water heat exchanger 5, as long as the second compressor 30 does not operate in the second refrigerant circuit 3, and thus, the second refrigerant R2 does not circulate in the second refrigerant circuit 3 or although the second compressor 30 operates, the second refrigerant R2 flows through the second refrigerant/cooling water heat exchanger bypass pipeline 3*c*, and thus, the second refrigerant/cooling water heat exchanger 5 stops to work. The same goes for a vehicle interior cooling mode, a vehicle interior cooling/battery cooling mode, and the vehicle interior heating/battery cooling mode, which are described later.

Thus, in the vehicle interior heating mode, exhaust heat from the electric components 23 obtained by absorbing heat from the electric components 23 in the cooling water circuit 2 is used as a heating source to heat the first refrigerant R1 in the first refrigerant circuit 1 effectively, so that the vehicle interior is effectively heated.

(Vehicle Interior Cooling Mode)

Figure 4:
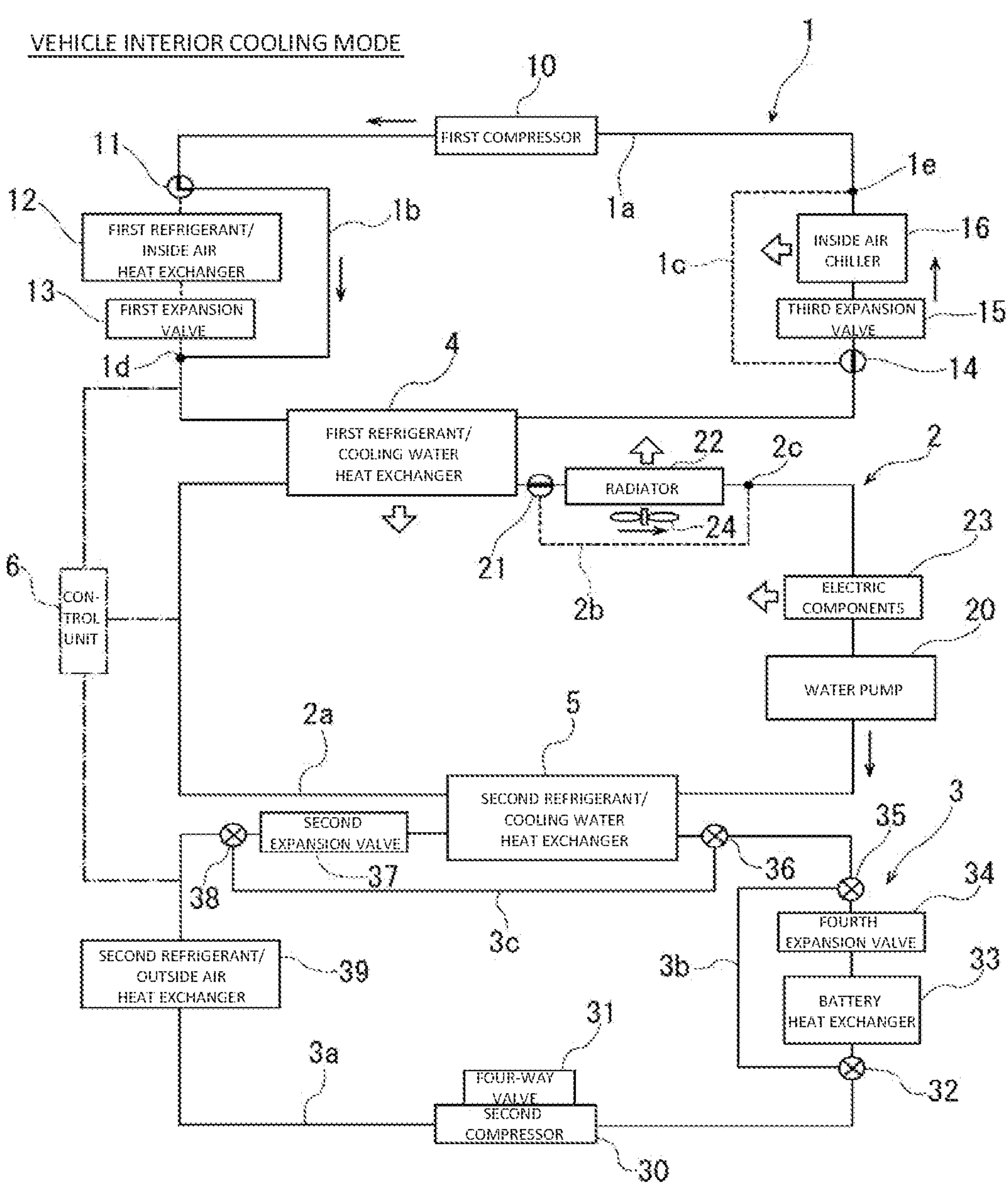
FIG. 4 is a system configuration diagram for explaining a vehicle interior cooling mode in the vehicle thermal management system according to the embodiment.

The first refrigerant circuit 1 and the cooling water circuit 2 operate in the vehicle interior cooling mode, which is illustrated in a system configuration in FIG. 4, by a control of the control unit 6. In the vehicle interior cooling mode, the first stop mode, the second normal mode, and the third normal mode are set in operation.

The first refrigerant circuit 1 in the vehicle interior cooling mode serves as the vehicle interior cooling/cooling water heating circuit where the inside air is cooled to cool the vehicle interior and heat is dissipated into the cooling water L in the cooling water circuit 2. The first refrigerant circuit 1 in the vehicle interior cooling mode operates in the first stop mode and the second normal mode.

In the first refrigerant circuit 1 in the vehicle interior cooling mode, which operates in the first stop mode and the second normal mode, the first refrigerant R1 compressed by the first compressor 10 is introduced into the first refrigerant/cooling water heat exchanger 4 through the first refrigerant/inside air heat exchanger bypass pipeline 1*b*. The first refrigerant/cooling water heat exchanger 4 serves as the condenser in the first refrigerant circuit 1 where the first refrigerant R1 dissipates heat into the cooling water L in the cooling water circuit 2 at the first refrigerant/cooling water heat exchanger 4. The first refrigerant R1 after dissipating the heat is reduced in pressure by the third expansion valve 15, and introduced into the inside air chiller 16. The inside air chiller 16 serves as the evaporator in the first refrigerant circuit 1 where the first refrigerant R1 absorbs heat from the inside air at the inside air chiller 16 to cool the vehicle interior. The first refrigerant R1 after absorbing the heat is introduced into the first compressor 10.

The cooling water circuit 2 in the vehicle interior cooling mode serves as the heat dissipation circuit where the cooling water L dissipates heat into the outside air at the radiator 22. The cooling water circuit 2 in the vehicle interior cooling mode operates in the third normal mode. When the cooling water circuit 2 operates in the third normal mode, the cooling fan 24 for the radiator 22 is operated.

In the cooling water circuit 2 in the vehicle interior cooling mode, which operates in the third normal mode, the cooling water L pumped by the water pump 20 flows through the second refrigerant/cooling water heat exchanger 5, the first refrigerant/cooling water heat exchanger 4, the radiator 22, and the electric components 23 in this order, and then, is introduced to the water pump 20. The cooling water L circulating in the cooling water circuit 2 dissipates heat from the electric components 23 to cool the electric components 23, absorbs heat from the first refrigerant R1 in the first refrigerant circuit 1 at the first refrigerant/cooling water heat exchanger 4, and dissipates heat into the outside air at the radiator 22. It is suppressed by the heat dissipation into the outside air at the radiator 22 that the temperature of the cooling water L in the cooling water circuit 2 excessively becomes high.

Thus, in the vehicle interior cooling mode, the vehicle interior is effectively cooled in the first refrigerant circuit 1 in accordance with a cooling performance of the first refrigerant circuit 1 while the cooling water L dissipates heat into the outside air in the cooling water circuit 2.

(Battery Cooling Mode)

Figure 5:
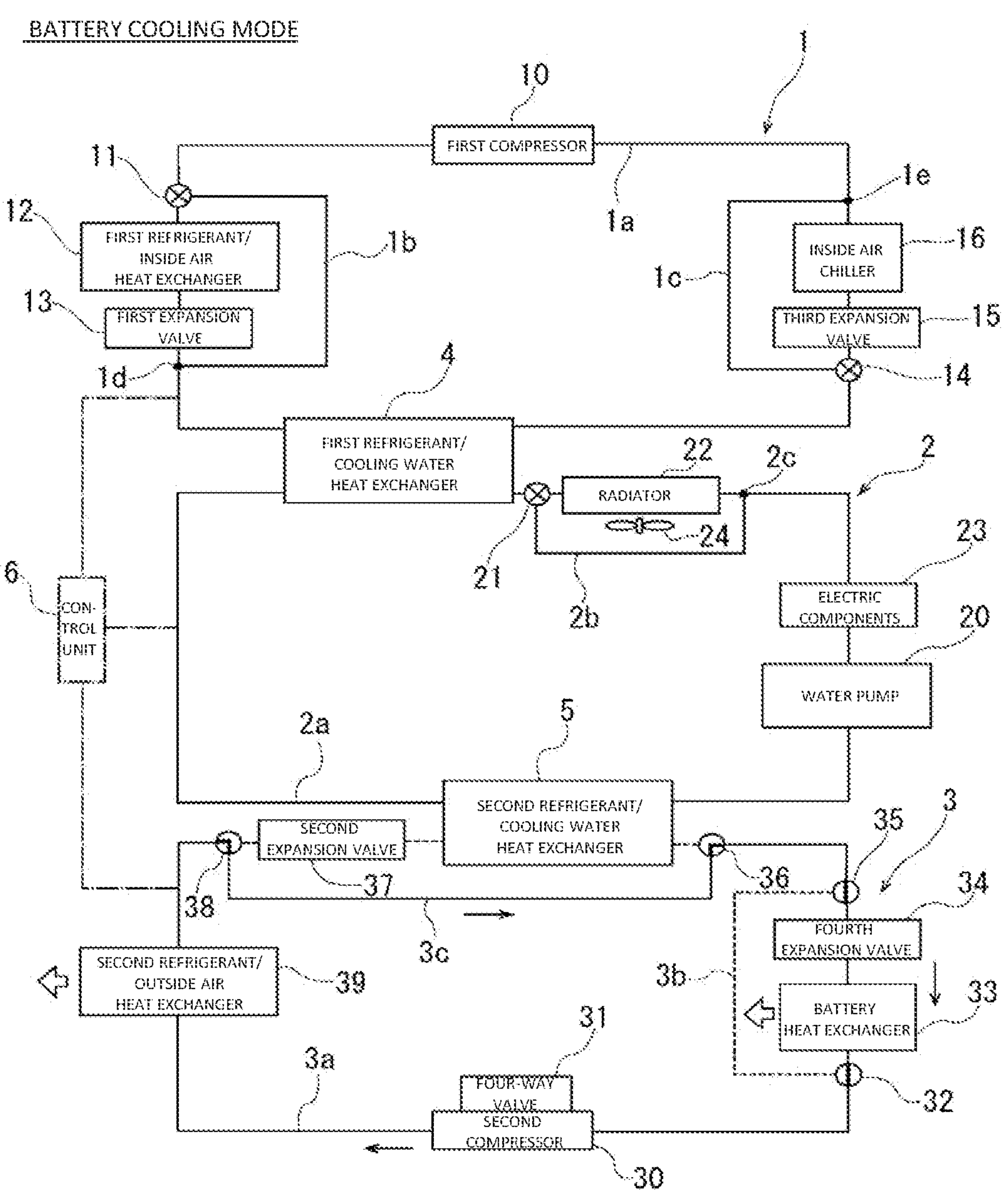
FIG. 5 is a system configuration diagram for explaining a battery cooling mode in the vehicle thermal management system according to the embodiment.

The second refrigerant circuit 3 operates in the battery cooling mode. which is illustrated in a system configuration in FIG. 5, by a control of the control unit 6. The second refrigerant circuit 3 in the battery cooling mode serves as the battery cooling circuit where heat is dissipated into the outside air and the in-vehicle battery is cooled.

In the second refrigerant circuit 3 in the battery cooling mode, the circulation direction of the second refrigerant R2 is controlled by a control of the four-way valve 31 such that the second refrigerant R2 compressed by the second compressor 30 flows toward the second refrigerant/outside air heat exchanger 39, and the second refrigerant R2 circulates in the second refrigerant circuit 3 in the clockwise direction in FIG. 5. The second refrigerant circuit 3 in the battery cooling mode operates in the fourth normal mode and the fifth stop mode.

In the battery cooling mode, the second refrigerant R2 circulates in the clockwise direction in FIG. 5 in the second refrigerant circuit 3 and the second refrigerant circuit 3 operates in the fourth normal mode and the fifth stop mode. In the second refrigerant circuit 3, the second refrigerant R2 compressed by the second compressor 30 is introduced into the second refrigerant/outside air heat exchanger 39 through the four-way valve 31. The second refrigerant/outside air heat exchanger 39 serves as the condenser in the second refrigerant circuit 3 where the second refrigerant R2 dissipates heat into the outside air at the second refrigerant/outside air heat exchanger 39. The second refrigerant R2 after dissipating the heat is introduced into the fourth expansion valve 34 through the second refrigerant/cooling water heat exchanger bypass pipeline 3*c*. The second refrigerant R2 is reduced in pressure by the fourth expansion valve 34, and is introduced into the battery heat exchanger 33. The battery heat exchanger 33 serves as the evaporator in the second refrigerant circuit 3 where the second refrigerant R2 absorbs heat from the in-vehicle battery at the battery heat exchanger 33 to cool the in-vehicle battery. The second refrigerant R2 after absorbing the heat is introduced into the second compressor 30 through the four-way valve 31.

Thus, the in-vehicle battery is more effectively cooled in accordance with the cooling performance of the second refrigerant circuit 3 by the second refrigerant circuit 3 that independently operates.

(Battery Warm-Up Mode)

Figure 6:
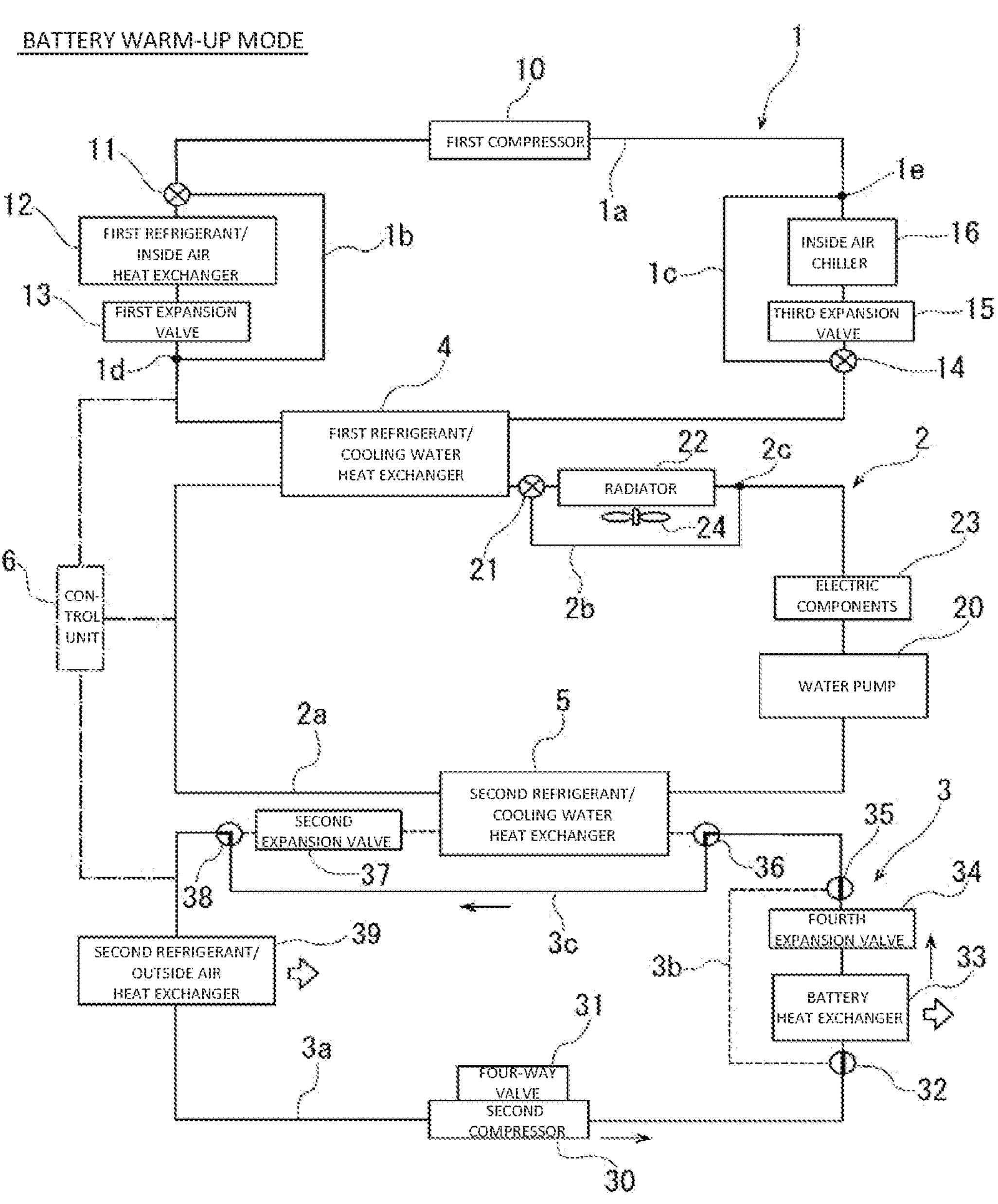
FIG. 6 is a system configuration diagram for explaining a battery warm-up mode in the vehicle thermal management system according to the embodiment.

The second refrigerant circuit 3 operates in a battery warm-up mode, which is illustrated in a system configuration in FIG. 6, by a control of the control unit 6. The second refrigerant circuit 3 in the battery warm-up mode serves as the battery warm-up circuit where heat is absorbed from the outside air and the in-vehicle battery is warmed up.

In the second refrigerant circuit 3 in the battery warm-up mode, the circulation direction of the second refrigerant R2 is controlled by the control of the four-way valve 31 such that the second refrigerant R2 compressed by the second compressor 30 flows toward the battery heat exchanger 33, and the second refrigerant R2 circulates in the second refrigerant circuit 3 in the counterclockwise direction in FIG. 6. The second refrigerant circuit 3 in the battery warm-up mode operates in the fourth normal mode and the fifth stop mode.

In the battery warm-up mode, the second refrigerant R2 circulates in the second refrigerant circuit 3 in the counterclockwise direction in FIG. 6 and the second refrigerant circuit 3 operates in the fourth normal mode and the fifth stop mode. In the second refrigerant circuit 3, the second refrigerant R2 compressed by the second compressor 30 is introduced into the battery heat exchanger 33 through the four-way valve 31. The battery heat exchanger 33 serves as the condenser in the second refrigerant circuit 3 where the second refrigerant R2 dissipates heat into the in-vehicle battery at the battery heat exchanger 33 to warm up the in-vehicle battery. The second refrigerant R2 after dissipating the heat is reduced in pressure by the fourth expansion valve 34, and introduced into the second refrigerant/outside air heat exchanger 39 through the second refrigerant/cooling water heat exchanger bypass pipeline 3*c*. The second refrigerant/outside air heat exchanger 39 serves as the evaporator in the second refrigerant circuit 3, and the second refrigerant R2 absorbs heat from the outside air at the second refrigerant/outside air heat exchanger 39. The second refrigerant R2 after absorbing the heat is introduced into the second compressor 30 through the four-way valve 31.

Thus, the in-vehicle battery is effectively warmed up in accordance with a heating performance of the second refrigerant circuit 3 by the second refrigerant circuit 3 that independently operates.

(Vehicle Interior Cooling/Battery Cooling Mode)

Figure 7:
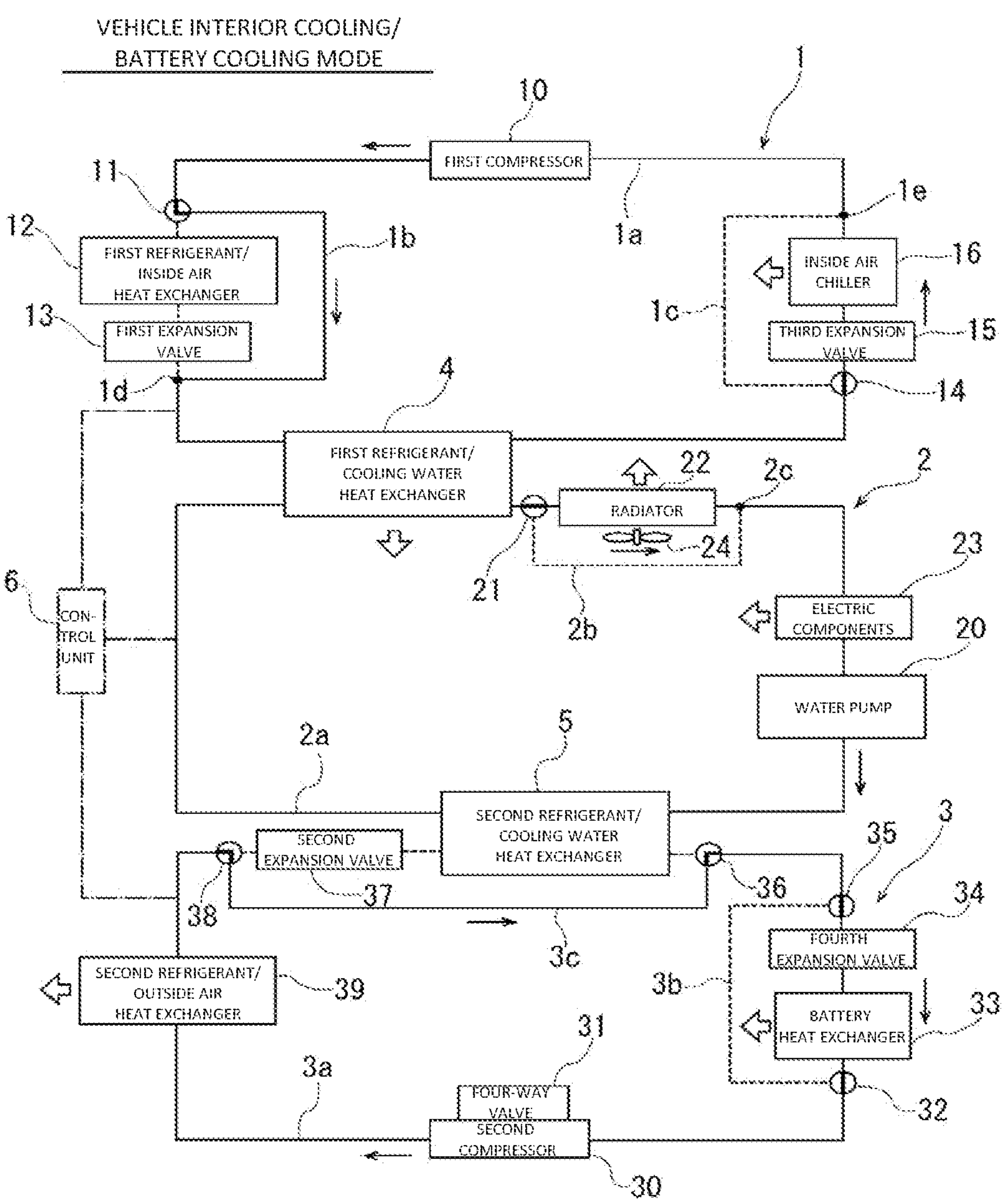
FIG. 7 is a system configuration diagram for explaining a vehicle interior cooling/battery cooling mode in the vehicle thermal management system according to the embodiment.

The first refrigerant circuit 1, the cooling water circuit 2, and the second refrigerant circuit 3 operate in the vehicle interior cooling/battery cooling mode, which is illustrated in a system configuration of FIG. 7, by a control of the control unit 6. In the vehicle interior cooling/battery cooling mode, the first stop mode, the second normal mode, the third normal mode, the fourth normal mode, and the fifth stop mode are set in operation.

Similarly to the vehicle interior cooling mode, the first refrigerant circuit 1 in the vehicle interior cooling/battery cooling mode serves as the vehicle interior cooling/cooling water heating circuit, and operates in the first stop mode and the second normal mode. The first refrigerant R1 circulating in the first refrigerant 30 circuit 1 dissipates heat into the cooling water L at the first refrigerant/cooling water heat exchanger 4, and the first refrigerant R1 absorbs heat from the inside air at the inside air chiller 16 to cool the vehicle interior.

Similarly to the vehicle interior cooling mode, the cooling water circuit 2 in the vehicle interior cooling/battery cooling mode serves as the heat dissipation circuit, and operates in the third normal mode. The cooling water L circulating in the cooling water circuit 2 absorbs heat from the electric components 23 to cool the electric components 23, absorbs heat from the first refrigerant R1 at the first refrigerant/cooling water heat exchanger 4, and dissipates the heat into the outside air at the radiator 22.

Similarly to the battery cooling circuit, the second refrigerant circuit 3 in the vehicle interior cooling/battery cooling mode serves as the battery cooling circuit, and the second refrigerant R2 circulates in the second refrigerant circuit 3 in the clockwise direction in FIG. 7 and the second refrigerant circuit 3 operates in the fourth normal mode and the fifth stop mode. The second refrigerant R2 circulating in the second refrigerant circuit 3 dissipates heat into the outside air at the second refrigerant/outside air heat exchanger 39, and the second refrigerant R2 absorbs heat from the in-vehicle battery at the battery heat exchanger 33 to cool the in-vehicle battery.

Thus, in the vehicle interior cooling/battery cooling mode, the vehicle interior is effectively cooled in the first refrigerant circuit 1 in accordance with the cooling performance of the first refrigerant circuit 1 while the cooling water L dissipates heat into the outside air in the cooling water circuit 2. In addition, the in-vehicle battery is effectively cooled in accordance with the cooling performance of the second refrigerant circuit 3 by the second refrigerant circuit 3.

(Vehicle Interior Heating/Battery Cooling Mode)

The first refrigerant circuit 1, the cooling water circuit 2, and the second refrigerant circuit 3 operate in the vehicle interior heating/battery cooling mode, which is illustrated in a system configuration of FIG. 8, by a control of the control unit 6. In the vehicle interior heating/battery cooling mode, the first refrigerant circuit 1, the cooling water circuit 2, and the second refrigerant circuit 3 operate in the first normal mode, the second stop mode, the third stop mode, the fourth normal mode, and the fifth stop mode.

Similarly to the two-stage heat pump mode and the vehicle interior heating mode, the first refrigerant circuit 1 in the vehicle interior heating/battery cooling mode serves as the vehicle interior heating/cooling water cooling circuit, and operates in the first normal mode and the second stop mode. The first refrigerant R1 circulating in the first refrigerant circuit 1 dissipates heat into the inside air at the first refrigerant/inside air heat exchanger 12 to heat the vehicle interior, and the first refrigerant R1 absorbs heat from the cooling water L at the first refrigerant/cooling water heat exchanger 4.

Similarly to the two-stage heat pump mode and the vehicle interior heating mode, the cooling water circuit 2 in the vehicle interior heating/battery cooling mode serves as the non-heat dissipation circuit, and operates in the third stop mode. The cooling water L circulating in the cooling water circuit 2 absorbs heat from the electric components 23 to cool the electric components 23, and the cooling water L dissipates heat into the first refrigerant R1 at the first refrigerant/cooling water heat exchanger 4. When the temperature outside is higher than the temperature of the cooling water L in vehicle interior heating/battery cooling mode, the cooling water circuit 2 may serve as the non-heat dissipation circuit where the cooling water L absorbs heat from the outside air at the radiator 22. In this case, the cooling water circuit 2 in the vehicle interior heating/battery cooling mode operates in the third normal mode. After the cooling water L circulating in the cooling water circuit 2 dissipates heat into the first refrigerant R1 at the first refrigerant/cooling water heat exchanger 4, the cooling water L absorbs heat from the outside air at the radiator 22 and also absorbs heat from the electric components 23 to cool the electric components 23. Thus, it is suppressed that the temperature of the cooling water L in the cooling water circuit 2 becomes excessively low.

Similarly to the battery cooling mode, the second refrigerant circuit 3 in the vehicle interior heating/battery cooling mode serves as the battery cooling circuit, and the second refrigerant R2 circulates in the second refrigerant circuit 3 in the clockwise direction in FIG. 8 and operates in the fourth normal mode and the fifth stop mode. The second refrigerant R2 circulating in the second refrigerant circuit 3 dissipates heat into the outside air at the second refrigerant/outside air heat exchanger 39, and the second refrigerant R2 absorbs heat from the in-vehicle battery at the battery heat exchanger 33 to cool the in-vehicle battery.

Thus, in the vehicle interior heating/battery cooling mode, exhaust heat from the electric components 23 obtained by absorbing heat from the electric components 23 in the cooling water circuit 2 is used as a heat source to heat the first refrigerant R1 in the first refrigerant circuit 1 effectively, so that the vehicle interior is effectively heated. In addition, the in-vehicle battery is also effectively cooled in accordance with the cooling performance of the second refrigerant circuit 3 by the second refrigerant circuit 3.

In the above description, the present invention has been explained based on the embodiment; however, the present invention is not limited to the above-described embodiment and may be modified as appropriate within a scope of the present invention.

For example, in the above embodiment, the first refrigerant R1 flows through the first refrigerant/inside air heat exchanger bypass pipeline 1*b* in the first refrigerant circuit 1 in the first stop mode; however, the first stop mode is not limited thereto. For example, in the first stop mode, the first refrigerant R1 may flow not through the first refrigerant/inside air heat exchanger bypass pipeline 1*b* but through the first refrigerant pipeline 1*a* in which the first refrigerant/inside air heat exchanger 12 is provided, the expansion of the first refrigerant R1 at the first expansion valve 13 may be stopped, and the inside air may be caused to flow around the first refrigerant/inside air heat exchanger 12 such that the inside air does not flow through the first refrigerant/inside air heat exchanger 12.

In the above embodiment, the first refrigerant R1 flows through the inside air chiller bypass pipeline 1*c* in the first refrigerant circuit 1 in the second stop mode; however, the second stop mode is not limited thereto. For example, in the second stop mode, the first refrigerant R1 may flow not through the inside air chiller bypass pipeline 1*c* but through the first refrigerant pipeline 1*a* in which the inside air chiller 16 is provided, the expansion of the first refrigerant R1 at the third expansion valve 15 may be stopped, and the inside air may be caused to flow around the inside air chiller 16 such that the inside air does not flow through the inside air chiller 16.

In order to cause the inside air to flow around the first refrigerant/inside air heat exchanger 12 or the inside air chiller 16, for example, an air damper of an HVAC (Heating, Ventilating and Air Conditioning) only needs to be switched or the blower fan only needs to be stopped.

In order to stop the expansion of the first refrigerant R1 at the first expansion valve 13 and the third expansion valve 15, for example, a throttling opening degree only needs to be controlled such that the first expansion valve 13 and the third expansion valve 15 are fully open, or the first refrigerant R1 only needs to be prevented from flowing through the first expansion valve 13 or the third expansion valve 15 by bypassing the first expansion valve 13 or the third expansion valve 15.

In the above embodiment, the cooling water L flows through the radiator bypass pipeline 2*b* in the cooling water circuit 2 in the third stop mode; however, the third stop mode is not limited thereto. For example, in the third stop mode, while the cooling water L may flow not through the radiator bypass pipeline 2*b* but the cooling water pipeline 2*a* in which the radiator 22 is provided, heat exchange between the cooling water L and the outside air at the radiator 22 may be stopped.

In order to stop the heat exchange between the cooling water L and the outside air, for example, a grill shutter attached to a grill portion in front of the vehicle only needs to be closed to prevent the outside air from flowing through the radiator 22, or the cooling fan 24 for the radiator 22 only needs to be stopped.

In the above embodiment, the second refrigerant R2 flows through the second refrigerant/cooling water heat exchanger bypass pipeline 3*c* in second refrigerant circuit 3 in the fifth stop mode; however, the fifth stop mode is not limited thereto. For example, in the fifth stop mode, the second refrigerant R2 may flow not through the second refrigerant/cooling water heat exchanger bypass pipeline 3*c* but through the second refrigerant pipeline 3*a* in which the second refrigerant/cooling water heat exchanger 5 is provided, the expansion of the second refrigerant R2 at the second expansion valve 37 may be stopped, and the cooling water L may be caused to flow around the second refrigerant/cooling water heat exchanger 5 such that the cooling water L does not flow through the second refrigerant/cooling water heat exchanger 5.

In order to cause the cooling water L to flow around the second refrigerant/cooling water heat exchanger 5, for example, a bypass pipeline that bypasses the second refrigerant/cooling water heat exchanger 5 and a three-way valve that switches the flow of the cooling water L between toward the bypass pipeline and toward the cooling water pipeline 2*a* only need to be provided in the cooling water circuit 2.

In order to stop the expansion of the second refrigerant R2 at the second expansion valve 37, for example, a throttling opening degree only needs to be controlled such that the second expansion valve 37 is fully open, or the second refrigerant R2 only needs to be caused to flow around the second expansion valve 37 such that the second refrigerant R2 does not flow through the second expansion valve 37.

In the above embodiment, the water pump 20, the second refrigerant/cooling water heat exchanger 5, the first refrigerant/cooling water heat exchanger 4, the radiator 22, and the electric components 23 are arranged in this order in the circulation direction of the cooling water L in the cooling water circuit 2; however, the circulation direction of the cooling water L and the arrangement order of the parts in the cooling water circuit 2 are not limited thereto. Here, from a viewpoint of the cooling performance of the cooling water L against the electric components 23, during the operation in the two-stage heat pump mode, the second refrigerant/cooling water heat exchanger 5, the first refrigerant/cooling water heat exchanger 4, and the electric components 23 are preferably arranged in this order in the circulation direction of the cooling water L. In addition, during the operation in the vehicle interior cooling mode, the first refrigerant/cooling water heat exchanger 4, the radiator 22, and the electric components 23 are preferably arranged in this order in the circulation direction of the cooling water L. Accordingly, the second refrigerant/cooling water heat exchanger 5, the first refrigerant/cooling water heat exchanger 4, the radiator 22, and the electric components 23 are preferably arranged in this order in the circulation direction of the cooling water L.

INDUSTRIAL APPLICABILITY

The vehicle thermal management system of the present invention may be used for a battery-mounted vehicle.

REFERENCE SIGNS LIST

1 first refrigerant circuit
2 cooling water circuit
3 second refrigerant circuit
4 first refrigerant/cooling water heat exchanger
5 second refrigerant/cooling water heat exchanger
6 control unit
10 first compressor
11 first three-way valve (first refrigerant/inside air heat exchanger bypass switching unit)
12 first refrigerant/inside air heat exchanger
13 first expansion valve
14 second three-way valve (first refrigerant/inside air heat exchanger bypass switching unit)
15 third expansion valve
16 inside air chiller
1*b* first refrigerant/inside air heat exchanger bypass pipeline
1*c* inside air chiller bypass pipeline
20 water pump
21 third three-way valve (radiator bypass switching unit)
22 radiator
23 electric component
2*b* radiator bypass pipeline
30 second compressor
31 four-way valve (direction switching unit)
32 fourth three-way valve (battery heat exchanger bypass switching unit)
35 fifth three-way valve (battery heat exchanger bypass switching unit)
33 battery heat exchanger
34 fourth expansion valve
36 sixth three-way valve (second refrigerant/cooling water heat exchanger bypass switching unit)
38 seventh three-way valve (second refrigerant/cooling water heat exchanger bypass switching unit)
37 second expansion valve
39 second refrigerant/outside air heat exchanger
3*b* battery heat exchanger bypass pipeline
3*c* second refrigerant/cooling water heat exchanger bypass pipeline

The invention claimed is:

1. A vehicle thermal management system comprising:

a first refrigerant circuit including a first compressor that compresses first refrigerant and circulates the first refrigerant in the first refrigerant circuit, a first refrigerant/inside air heat exchanger that exchanges heat between the first refrigerant and inside air supplied into a vehicle interior, and a first expansion valve, the first refrigerant circuit being configured to perform air conditioning of the vehicle interior;

a cooling water circuit including a water pump that circulates cooling water in the cooling water circuit, the cooling water circuit being configured to cool an in-vehicle electric component;

a second refrigerant circuit including a second compressor that compresses second refrigerant and circulates the second refrigerant in the second refrigerant circuit, a second refrigerant/outside air heat exchanger that exchanges heat between the second refrigerant and outside air, and a second expansion valve, the second refrigerant circuit being configured to control a temperature of an in-vehicle battery;

a first refrigerant/cooling water heat exchanger connected to the first refrigerant circuit and the cooling water circuit, the first refrigerant/cooling water heat exchanger being configured to exchange heat between the first refrigerant and the cooling water;

a second refrigerant/cooling water heat exchanger connected to the second refrigerant circuit and the cooling water circuit, the second refrigerant/cooling water heat exchanger being configured to exchange heat between the second refrigerant and the cooling water; and a control unit configured to control operations of the first refrigerant circuit, the cooling water circuit, and the second refrigerant circuit, wherein the first refrigerant circuit, the cooling water circuit, and the second refrigerant circuit operate in a two-stage heat pump mode where the vehicle interior is heated, by a control of the control unit, in the first refrigerant circuit in the two-stage heat pump mode, the first refrigerant compressed by the first compressor dissipates heat into the inside air at the first refrigerant/inside air heat exchanger serving as a condenser in the first refrigerant circuit, the first refrigerant after dissipating the heat is reduced in pressure at the first expansion valve, the first refrigerant reduced in pressure absorbs heat from the cooling water at the first refrigerant/cooling water heat exchanger serving as an evaporator in the first refrigerant circuit, in the cooling water circuit in the two-stage heat pump mode, the cooling water circulating in the cooling water circuit absorbs heat from the second refrigerant at the second refrigerant/cooling water heat exchanger and dissipates heat into the first refrigerant at the first refrigerant/cooling water heat exchanger, and in the second refrigerant circuit in the two-stage heat pump mode, the second refrigerant compressed by the second compressor dissipates heat into the cooling water at the second refrigerant/cooling water heat exchanger serving as a condenser in the second refrigerant circuit, the second refrigerant after dissipating the heat is reduced in pressure at the second expansion valve, and the second refrigerant reduced in pressure absorbs heat from the outside air at the second refrigerant/outside air heat exchanger serving as an evaporator in the second refrigerant circuit.

2. The vehicle thermal management system according to claim 1, wherein the first refrigerant circuit includes a third expansion valve and an inside air chiller that exchanges heat between the first refrigerant and the inside air, the cooling water circuit includes a radiator that exchanges heat between the cooling water and the outside air, the second refrigerant circuit includes a fourth expansion valve and a battery heat exchanger that exchanges heat between the second refrigerant and the in-vehicle battery, the control unit is configured to switch between a first normal mode and a first stop mode, wherein in the first normal mode, the first refrigerant/inside air heat exchanger exchanges heat between the first refrigerant and the inside air, and the first refrigerant is expanded at the first expansion valve, and in the first stop mode, the first refrigerant circulates in a state in which heat exchange between the first refrigerant and the inside air at the first refrigerant/inside air heat exchanger is stopped, and expansion at the first expansion valve is stopped, the control unit is configured to switch between a second normal mode and a second stop mode, wherein in the second normal mode, the inside air chiller exchanges heat between the first refrigerant and the inside air, and the first refrigerant is expanded at the third expansion valve, and in the second stop mode, the first refrigerant circulates in a state in which heat exchange between the first refrigerant and the inside air at the inside air chiller is stopped, and expansion at the third expansion valve is stopped, the control unit is configured to switch between a third normal mode and a third stop mode, wherein in the third normal mode, the radiator exchanges heat between the cooling water and the outside air, and in the third stop mode, the cooling water circulates in a state in which heat exchange between the cooling water and the outside air at the radiator is stopped, the control unit is configured to switch between a fourth normal mode and a fourth stop mode, wherein in the fourth normal mode, the battery heat exchanger exchanges heat between the second refrigerant and the in-vehicle battery, and the second refrigerant is expanded at the fourth expansion valve, and in the fourth stop mode, the second refrigerant circulates in a state in which heat exchange between the second refrigerant and the in-vehicle battery at the battery heat exchanger is stopped, and expansion at the fourth expansion valve is stopped, the control unit is configured to switch between a fifth normal mode and a fifth stop mode, wherein in the fifth normal mode, the second refrigerant/cooling water heat exchanger exchanges heat between the second refrigerant and the cooling water, and the second refrigerant is expanded at the second expansion valve, and in the fifth stop mode, the second refrigerant circulates in a state in which heat exchange between the second refrigerant and the cooling water at the second refrigerant/cooling water heat exchanger is stopped, and expansion at the second expansion valve is stopped, and the first normal mode, the second stop mode, the third stop mode, the fourth stop mode, and the fifth normal mode are set in operation in the two-stage heat pump mode by the control unit.

3. The vehicle thermal management system according to claim 2, wherein the first refrigerant circuit and the cooling water circuit operate in a vehicle interior cooling mode where the vehicle interior is cooled, by a control of the control unit, the first stop mode, the second normal mode, and the third normal mode are set in operation in the vehicle interior cooling mode by the control unit, in the first refrigerant circuit in the vehicle interior cooling mode, the first refrigerant compressed by the first compressor dissipates heat into the cooling water at the first refrigerant/cooling water heat exchanger serving as a condenser in the first refrigerant circuit, the first refrigerant after dissipating the heat is reduced in pressure at the third expansion valve, the first refrigerant reduced in pressure absorbs heat from the inside air at the inside air chiller serving as an evaporator in the first refrigerant, and in the cooling water circuit in the vehicle interior cooling mode, the cooling water circulating in the cooling water circuit absorbs heat from the first refrigerant at the first refrigerant/cooling water heat exchanger and dissipates heat into the outside air at the radiator.

4. The vehicle thermal management system according to claim 2, wherein the second refrigerant circuit includes a direction switching unit that reverses a circulation direction of the second refrigerant, the second refrigerant circuit operates in a battery cooling mode where the in-vehicle battery is cooled, by a control of the control unit, the fourth normal mode and the fifth stop mode are set in operation in the battery cooling mode by the control unit, the control unit controls the circulation direction of the second refrigerant with the direction switching unit such that the second refrigerant compressed by the second compressor flows toward the second refrigerant/outside air heat exchanger in the second refrigerant circuit, and the second refrigerant circuit in the battery cooling mode, the second refrigerant compressed by the second compressor dissipates heat into the outside air at the second refrigerant/outside air heat exchanger serving as a condenser in the second refrigerant circuit, the second refrigerant after dissipating the heat is reduced in pressure at the fourth expansion valve, and the second refrigerant reduced in pressure absorbs heat from the in-vehicle battery at the battery heat exchanger serving as an evaporator in the second refrigerant circuit.

5. The vehicle thermal management system according to claim 2, wherein the second refrigerant circuit includes a direction switching unit that reverses a circulation direction of the second refrigerant, the second refrigerant circuit operates in a battery warm-up mode where the in-vehicle battery is heated, by a control of the control unit, the fourth normal mode and the fifth stop mode are set in operation in the battery warm-up mode by the control unit, the control unit controls the circulation direction of the second refrigerant with the direction switching unit such that the second refrigerant compressed by the second compressor flows toward the battery heat exchanger in the second refrigerant circuit, and in the second refrigerant circuit in the battery warm-up mode, the second refrigerant compressed by the second compressor dissipates heat into the in-vehicle battery at the battery heat exchanger serving as a condenser in the second refrigerant circuit, the second refrigerant after dissipating the heat is reduced in pressure at the fourth expansion valve, and the second refrigerant reduced in pressure absorbs heat from the outside air at the second refrigerant/outside air heat exchanger serving as an evaporator in the second refrigerant circuit.

6. The vehicle thermal management system according to claim 2, wherein the first refrigerant circuit includes a first refrigerant/inside air heat exchanger bypass that bypasses the first refrigerant/inside air heat exchanger and the first expansion valve and a first refrigerant/inside air heat exchanger bypass switching unit that switches the flow of the first refrigerant between toward the first refrigerant/inside air heat exchanger and the first expansion valve and toward the first refrigerant/inside air heat exchanger bypass, the control unit controls the first refrigerant/inside air heat exchanger bypass switching unit such that the first refrigerant flows toward the first refrigerant/inside air heat exchanger and the first expansion valve in the first normal mode, and the control unit controls the first refrigerant/inside air heat exchanger bypass switching unit such that the first refrigerant flows toward the first refrigerant/inside air heat exchanger bypass in the first stop mode.

7. The vehicle thermal management system according to claim 2, wherein the first refrigerant circuit includes an inside air chiller bypass that bypasses the inside air chiller and the third expansion valve and an inside air chiller bypass switching unit that switches the flow of the first refrigerant between toward the inside air chiller and the third expansion valve and toward the inside air chiller bypass, the control unit controls the inside air chiller bypass switching unit such that the first refrigerant flows through the inside air chiller and the third expansion valve in the second normal mode, and the control unit controls the inside air chiller bypass switching unit such that the first refrigerant flows through the inside air chiller bypass in the second stop mode.

8. The vehicle thermal management system according to claim 2, wherein the cooling water circuit includes a radiator bypass that bypasses the radiator and a radiator bypass switching unit that switches the flow of the cooling water between toward the radiator and toward the radiator bypass, the control unit controls the radiator bypass switching unit such that the cooling water flows through the radiator in the third normal mode, and the control unit controls the radiator bypass switching unit such that the cooling water flows through the radiator bypass in the third stop mode.

9. The vehicle thermal management system according to claim 2, wherein the second refrigerant circuit includes a battery heat exchanger bypass that bypasses the battery heat exchanger and the fourth expansion valve and a battery heat exchanger bypass switching unit that switches the flow of the second refrigerant between toward the battery heat exchanger and the fourth expansion valve and toward the battery heat exchanger bypass, the control unit controls the battery heat exchanger bypass switching unit such that the second refrigerant flows toward the battery heat exchanger and the fourth expansion valve in the fourth normal mode, and the control unit controls the battery heat exchanger bypass switching unit such that the second refrigerant flows toward the battery heat exchanger bypass in the fourth stop mode.

10. The vehicle thermal management system according to claim 2, wherein the second refrigerant circuit includes a second refrigerant/cooling water heat exchanger bypass that bypasses the second refrigerant/cooling water heat exchanger and the second expansion valve and a second refrigerant/cooling water heat exchanger bypass switching unit that switches the flow of the second refrigerant between toward the second refrigerant/cooling water heat exchanger and the second expansion valve and toward the second refrigerant/cooling water heat exchanger bypass, the control unit controls the second refrigerant/cooling water heat exchanger bypass switching unit such that the second refrigerant flows toward the second refrigerant/cooling water heat exchanger and the second expansion valve in the fifth normal mode, and the control unit controls the second refrigerant/cooling water heat exchanger bypass switching unit such that the second refrigerant flows toward the second refrigerant/cooling water heat exchanger bypass in the fifth stop mode.

* * * * *